United States Patent [19]

Inadome et al.

[11] Patent Number: 5,517,361
[45] Date of Patent: May 14, 1996

[54] ZOOM LENS SYSTEM

[75] Inventors: Kiyotaka Inadome, Kawasaki; Masahiro Nakatsuji, Machida; Haruo Sato, Kawasaki; Hideo Kanno, Chiba, all of Japan

[73] Assignee: Nikon Corporation, Tokyo, Japan

[21] Appl. No.: 148,070

[22] Filed: Nov. 5, 1993

[30]  Foreign Application Priority Data

Dec. 11, 1992 [JP] Japan ................................. 4-331712
Dec. 15, 1992 [JP] Japan ................................. 4-334196

[51] Int. Cl.$^6$ ................................................. G02B 15/14
[52] U.S. Cl. ........................... 359/684; 359/693; 359/694; 359/700; 359/701
[58] Field of Search ................................. 359/694, 695, 359/699, 693, 684, 700, 701

[56]  References Cited

U.S. PATENT DOCUMENTS

| | | | |
|---|---|---|---|
| 4,729,644 | 3/1988 | Ueyama | 359/701 |
| 4,963,006 | 10/1990 | Inadome | 359/684 |
| 5,018,843 | 5/1991 | Inadome et al. | 359/684 |
| 5,144,490 | 9/1992 | Yamanouchi | 359/694 |
| 5,151,729 | 9/1992 | Takayama | 154/195 |
| 5,337,187 | 8/1994 | Fukino et al. | 359/695 |

FOREIGN PATENT DOCUMENTS 2-256011 10/1990 Japan .
5-142475 6/1993 Japan .
2084346 4/1982 United Kingdom .

OTHER PUBLICATIONS

Patent Abstracts of Japan, vol. 13, No. 422, (P–933), 20 Sep. 1989 (JP–A–01 154 110).

*Primary Examiner*—Georgia Y. Epps
*Assistant Examiner*—Evelyn A. Lester
*Attorney, Agent, or Firm*—Shapiro and Shapiro

[57]  ABSTRACT

A zoom lens system, with both zooming and focusing functions, has a plurality of lens groups including at least two focusing lens groups which move differently from each other either in zooming or in focusing, wherein when a certain movement trace for zooming is expressed with a variable of rotation angle of a rotating barrel for defining a displacement amount of a lens group along an optical axis, a movement trace of the first focusing lens group is formed by a combination of a first focus cam with a first compensating zoom cam, a movement trace of an n-th focusing lens group is formed by a combination of an n-th focus cam with an n-th compensating zoom cam, and a movement trace of each movable non-focusing lens group taking no part in focusing is formed by a combination of one of the first to n-th compensating zoom cams with a zoom cam for the non-focusing lens group.

25 Claims, 8 Drawing Sheets

ZOOM LENS SYSTEM

BACKGROUND OF THE INVENTION

1. Field of the Invention

The present invention relates to a zoom lens barrel and particularly to a focusing method thereof, specifically to a so-called inner focus or rear focus method, in which a plurality of lens groups are moved in a lens system.

2. Related Background Art

There are recently investigated or proposed various focusing methods other than the front lens advance method, for size reduction or the pursuit of high performance of a zoom lens. It is known that the so-called floating-type inner focus or rear focus method with a plurality of lens groups being moved in the lens system is effective especially to achieve high performance. Actually, there are a variety of methods proposed in optical design, but it has been difficult to realize such methods with simple structure in mechanical design together with the so-called manual focus. The reason is that for the so-called floating a plurality of lens groups move independent of each other for focusing and that movement amounts thereof for focusing change with change of zooming position. This made it very difficult to achieve the mechanical structure to attain the movement amount necessary for each focusing lens group at each focusing position and at each zooming position.

SUMMARY OF THE INVENTION

It is, therefore, an object of the present invention to provide a high-performance zoom lens compact in size, light in weight and excellent in operability, which is constructed in simple structure to employ the so-called floating-type inner focus or rear focus method with a plurality of lens groups being moved in the lens system, and which also enables the so-called manual focus in addition to autofocus.

The present invention it is a further development based on the lens barrel structure of the zoom lens as proposed in Japanese Patent Application No. 3-304887.

Proposed in Japanese Patent Application No. 3-304887 is a zoom lens system with a plurality of lens groups including a focusing lens group movable in zooming and having both zooming and focusing functions, in which if a certain movement trace for zooming is expressed with a variable of rotation angle of a rotating barrel for defining a movement amount of a lens group along the optical axis, a movement trace of the focusing lens group is formed by a combination of a focus cam with a compensating zoom (zoom compensation) cam, and in which at the same time a movement trace of a movable non-focusing lens group taking no part in focusing is formed by a combination of the compensating zoom cam with a zoom cam for the non-focusing lens group.

In the present invention, a zoom lens system is constructed as follows to enable the so-called manual focus in the inner focus or rear focus method with a plurality of lens groups being moved in the zoom lens system.

The zoom lens system is provided with both zooming and focusing functions, and has a plurality of lens groups including at least two focusing lens groups which move differently from each other either in zooming or in focusing, wherein if a certain movement trace for zooming is expressed with a variable of rotation angle of a rotating barrel for defining a movement amount of a lens group along the optical axis, a movement trace of the first focusing lens group is formed by a combination of a first focus cam with a first compensating zoom (zoom compensation) cam, a movement trace of an n-th focusing lens group is formed by a combination of an n-th focus cam with an n-th compensating zoom (zoom compensation) cam, and a movement trace of each movable non-focusing lens group taking no part in focusing is formed by a combination of one of said first to n-th compensating zoom cams with a zoom cam for said non-focusing lens group.

Then, in case that there are two focusing lens groups, which move different from each other either in zooming or in focusing, a movement trace of the first focusing lens group is formed by a combination of a first focus cam with a first compensating zoom cam, a movement trace of the second focusing lens group is formed by a combination of a second focus cam with a second compensating zoom cam, and a movement trace of each movable non-focusing lens group taking no part in focusing is formed by a combination of either the first compensating zoom cam or the second compensating zoom cam with a zoom cam for the non-focusing lens group.

Also, in case that there are three focusing lens groups, which move different from one another either in zooming or in focusing, a movement trace of the first focusing lens group is formed by a combination of a first focus cam with a first compensating zoom cam, a movement trace of the second focusing lens group is formed by a combination of a second focus cam with a second compensating zoom cam, a movement trace of the third focusing lens group is formed by a combination of a third focus cam with a third compensating zoom cam, and at the same time a movement trace of each movable non-focusing lens group taking no part in focusing is formed by a combination of the first compensating zoom cam, the second compensating zoom cam, or the third compensating zoom cam with a zoom cam for the non-focusing lens group.

Specifically, the shape of the focus cams are first determined such that when the focusing lens groups are moved for focusing, using the respective focus cams, lens advance amounts thereof for focusing at a zooming position are secured by a same rotation angle for each of specific shooting distances and that a displacement amount of an image point is minimal at an arbitrary focal length and at an arbitrary shooting distance.

Then with the focus cams, the compensating zoom cams are determined such that a combination of a focus cam with a corresponding compensating zoom cam forms a movement trace of each focusing lens group in zooming.

Finally, as to the movable non-focusing lens groups, each zoom cam for a corresponding non-focusing lens group is determined such that a combination thereof with one of the compensating zoom cams forms a movement trace of the each non-focusing lens group in zooming.

Accordingly, a movement trace of each focusing lens group is formed by a combination of the associated focus cam with a corresponding compensating zoom cam, and a movement trace of each movable non-focusing lens group taking no part in focusing is formed by a combination of one of the compensating zoom cams with a zoom cam for the non-focusing lens group.

Employing the above cam structure enables the manual focus of a zoom lens, in which a plurality of lens groups move independently of each other for focusing, to be accomplished with a simple structure in which a new cam barrel is added to the conventional stationary barrel and cam barrel.

In focusing, the focusing lens groups move on the respective focus cams by the same rotation angle, so that they move by desired advance amounts along the optical axis to achieve focusing.

On the other hand, in zooming, while each focusing lens group moves on the focus cam with rotation of a rotating barrel, it is combined with rotational movement of a corresponding compensating zoom cam, whereby the focusing lens group moves by a desired amount along the optical axis. Also, while each movable non-focusing lens group taking no part in focusing moves on a corresponding zoom cam with rotation of the rotating barrel, it is combined with rotational movement of one of the compensating zoom cams, whereby the non-focusing lens group moves by a desired amount along the optical axis to achieve zooming.

Another embodiment of the zoom lens system of the present invention is a zoom lens system with both zooming and focusing functions, having a plurality of lens groups including at least two focusing lens groups which move differently from each other either in zooming or in focusing, wherein if a certain movement trace for zooming is expressed with a variable of rotation angle of a rotating barrel for defining a displacement amount of a lens group along an optical axis, a movement trace of the first focusing lens group is formed by a combination of a first focus cam with a first compensating zoom cam, a movement trace of an n-th focusing lens group is formed by a combination of an n-th focus cam with an n-th compensating zoom cam, and at the same time a movement trace of at least one movable non-focusing lens group taking no part in focusing is determined only by a zoom cam for the non-focusing lens group without being combined with any one of the compensating zoom cams.

Specifically, the shape of the focus cams are first determined such that when the focusing lens groups are moved for focusing, using the respective focus cams, lens advance amounts thereof for focusing at a zooming position are secured by a same rotation angle for each of specific shooting distances, and such that a displacement amount of image point is minimal at an arbitrary focal length and at an arbitrary shooting distance.

Then with the focus cams, the compensating zoom cams are determined such that a combination of a focus cam with a corresponding compensating zoom cam forms a movement trace of each focusing lens group in zooming.

For the at least one movable non-focusing lens group, the movement trace thereof in zooming is determined by a zoom cam therefor.

Accordingly, a movement trace of each focusing lens group is formed by a combination of the associated focus cam with a corresponding compensating zoom cam, while a movement trace of at least one movable non-focusing lens group taking no part in focusing is formed by a zoom cam for the non-focusing lens group.

Employing the above cam structure enables the manual focus of a zoom lens, in which a plurality of lens groups move independently of each other for focusing, to be accomplished with a simple structure in which a new cam barrel is added to the conventional stationary barrel and cam barrel.

In focusing, the focusing lens groups move on the respective focus cams by the same rotation angle, so that they move by desired advance amounts along the optical axis to achieve focusing.

In zooming, while each focusing lens group moves on the focus cam with rotation of a rotating barrel, it is combined with rotational movement of a corresponding compensating zoom cam to move by a desired amount along the optical axis. Also, at least one movable non-focusing lens group taking no part in focusing moves on a zoom cam with rotation of the rotating barrel, so that it moves by a desired amount along the optical axis to achieve zooming.

As described above, the present invention employs a cam structure that allows for a simple constitution in which further cam barrels are newly added to the conventional stationary barrel and cam barrel, whereby a plurality of lens groups can move independently of each other for focusing, and which can enable the manual focus of floating-type inner focus zoom lens in which the lens advance amounts for focusing change depending upon the zooming position.

The shape of the focus cams are so determined that when the focusing lens groups are moved for focusing using the respective focus cams, the lens advance amounts thereof are assured at a zoom position by a same rotation angle for a specific shooting distance. Therefore, the focusing lens groups move on the focus cams by the same rotation angle in focusing, so that manual focus can be achieved.

On the other hand, in zooming, the focusing lens groups move on the focus cams with rotation of a rotating barrel and are combined with rotational movement of corresponding compensating zoom cams to move by respectively desired amounts along the optical axis. Also, at least one movable non-focusing lens group taking no part in focusing moves on the zoom cam with rotation of rotating barrel to move a desired amount along the optical axis, whereby zooming is carried out.

The other movable non-focusing lens groups taking no part in focusing move on corresponding zoom cams with rotation of the rotating barrel and are combined with rotational movement of one of the compensating zoom cams to move by respectively desired amounts along the optical axis, whereby zooming is carried out.

DESCRIPTION OF THE PREFERRED EMBODIMENTS

The present invention will be described in detail hereinafter with respect to several exemplary embodiments thereof.

Embodiment 1

Figure 1A:
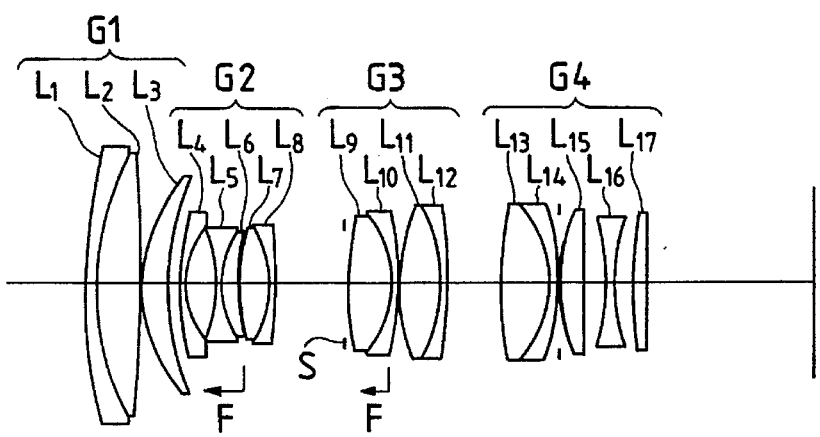
FIG. 1A is a diagram to show the lens structure of a zoom lens in Embodiment 1 according to the present invention.

In Embodiment 1, as shown in FIG. 1A, a zoom lens is composed, in order from the object side, of a first lens group G1 of positive refracting power, a second lens group G2 of negative refracting power, a third lens group G3 of positive refracting power, and a fourth lens group G4 of positive refracting power. All the lens groups move along the optical axis for zooming from wideangle to telephoto such that an air gap increases between the first lens group G1 and the second lens group G2, an air gap decreases between the second lens group G2 and the third lens group G3, and an air gap decreases between the third lens group G3 and the fourth lens group G4. Also, the second lens group G2 and the third lens group G3 move independently of each other toward the object along the optical axis for focusing.

The construction of each lens group is as follows. The first lens group G1 of positive refracting power is composed of a negative meniscus lens $L_1$ convex toward the object, a double convex lens $L_2$ cemented therewith, and a positive meniscus lens $L_3$ convex toward the object. The second lens group G2 of negative refracting power is composed of a negative meniscus lens $L_4$ with stronger curvature surface on the image side, a double concave negative lens $L_5$, a positive meniscus lens $L_6$ cemented therewith, a double convex lens $L_7$ and a negative meniscus lens $L_8$ with stronger curvature surface on the object side. The third lens group G3 of positive refracting power is composed of a double convex positive lens $L_9$, a negative meniscus lens $L_{10}$ cemented therewith, a double convex positive lens $L_{11}$ and a negative meniscus lens $L_{12}$ cemented therewith. The fourth lens group G4 of positive refracting power is composed of a positive lens $L_{13}$, a negative meniscus lens $L_{14}$ cemented therewith, a positive meniscus lens $L_{15}$ with stronger curvature surface on the object side, a double concave negative lens $L_{16}$, and a double convex lens $L_{17}$. An aperture stop S is provided on the object side of the third lens group G3 and incorporated with the third lens group G3.

Table 1 shows specifications of the zoom lens in Embodiment 1. In tables of specifications of embodiments, F represents a focal length (mm) and f an f-number.

TABLE 1

F = 36.0–102.0   f = 2.9

| r1 = 117.645 | d1 = 2.500 | n1 = 1.84666 | v1 = 23.8 L1 |
| r2 = 59.517 | d2 = 10.500 | n2 = 1.64000 | v2 = 60.0 L2 |

TABLE 1-continued

| r3 = –376.387 | d3 = .100 | | |
| r4 = 37.183 | d4 = 6.000 | n3 = 1.64000 | v3 = 60.0 L3 |
| r5 = 59.992 | d5 = 2.806 | | |
| r6 = 87.405 | d6 = 1.500 | n4 = 1.71300 | v4 = 54.0 L4 |
| r7 = 19.864 | d7 = 6.750 | | |
| r8 = –32.164 | d8 = 1.600 | n5 = 1.84042 | v5 = 43.3 L5 |
| r9 = 21.087 | d9 = 4.100 | n6 = 1.64831 | v6 = 33.8 L6 |
| r10 = 81.007 | d10 = .100 | | |
| r11 = 46.411 | d11 = 6.500 | n7 = 1.80458 | v7 = 25.5 L7 |
| r12 = –25.300 | d12 = .300 | | |
| r13 = –23.516 | d13 = 1.600 | n8 = 1.90265 | v8 = 35.8 L8 |
| r14 = –138.684 | d14 = 16.732 | | |
| r15 = .000 | d15 = 1.000 | | |
| r16 = 67.493 | d16 = 10.000 | n9 = 1.51680 | v9 = 64.1 L9 |
| r17 = –23.192 | d17 = 1.600 | n10 = 1.79631 | v10 = 40.9 L10 |
| r18 = –65.460 | d18 = .100 | | |
| r19 = 46.891 | d19 = 9.000 | n11 = 1.51680 | v11 = 64.1 L11 |
| r20 = –37.923 | d20 = 1.600 | n12 = 1.90265 | v12 = 35.8 L12 |
| r21 = –117.581 | d21 = 12.607 | | |
| r22 = 88.737 | d22 = 11.000 | n13 = 1.71300 | v13 = 54.0 L13 |
| r23 = –26.113 | d23 = 2.000 | n14 = 1.79631 | v14 = 40.9 L14 |
| r24 = –52.107 | d24 = .000 | | |
| r25 = .000 | d25 = .100 | | |
| r26 = 35.965 | d26 = 6.000 | n15 = 1.62041 | v15 = 60.3 L15 |
| r27 = 7948.096 | d27 = 5.000 | | |
| r28 = –49.252 | d28 = 2.000 | n16 = 1.84042 | v16 = 43.3 L16 |
| r29 = 38.984 | d29 = 4.000 | | |
| r30 = 79.307 | d30 = 3.600 | n17 = 1.51680 | v17 = 64.1 L17 |
| r31 = –817.793 | d31 = 38.000 | | | r6 = .1443E+02   .0000   .3417E–05   .1153E–08
                             –.2617E–10   .1721E–12
r30 = –.2232E+02  .0000  –.2269E–05   .5027E–08
                             –.4432E–10   .1145E–12

| | pos(1) | pos(2) | pos(3) | pos(4) | pos(5) | pos(6) |
|---|---|---|---|---|---|---|
| f & b | 35.989 | 60.000 | 102.000 | –.045 | –.067 | –.089 |
| d0 | .000 | .000 | .000 | 722.304 | 713.452 | 706.348 |
| d5 | 2.806 | 14.757 | 25.543 | 1.082 | 11.166 | 16.929 |
| d14 | 15.732 | 8.124 | 1.007 | 17.111 | 10.746 | 6.950 |
| d21 | 12.607 | 8.264 | 4.595 | 12.952 | 9.234 | 7.266 |
| d31 | 38.000 | 46.853 | 53.956 | 38.000 | 46.853 | 53.956 |

| | F | (1) | (2) | (3) | (4) | R (mm) |
|---|---|---|---|---|---|---|
| 1 | 35.989 | .000 | 1.724 | .345 | .000 | 890.00 |
| 2 | 60.000 | .000 | 3.591 | .970 | .000 | 890.00 |
| 3 | 102.000 | .000 | 8.614 | 2.671 | .000 | 890.00 |

In Table 1, r represents a radius of curvature of each lens surface (mm), d an interplanar gap between lenses (mm), n and v an index of refraction and an Abbe's number of each lens. Accompanying numerals to the characters represent the order counted from the object side end. The middle portion of Table 1 shows values of coefficients defining the shape of an aspherical surface formed on the lens surface $r_6$ on the object side in the second lens group G2 and that on the lens surface $r_{30}$ on the object side in the fourth lens group G4.

The aspherical surface is expressed by the following aspherical equation, if a height to the optical axis is h, a distance of a vertex of aspherical surface at h to the tangent plane is x, a conical constant is k, aspherical coefficients of second order, fourth order, sixth order, eighth order and tenth order are $A_2$, $A_4$, $A_6$, $A_8$ and $A_{10}$, respectively, and a paraxial radius of curvature is r.

$$x = \frac{h^2/r}{1 + (1 - kh^2/r^2)^{1/2}} + \sum_{i=1}^{5} A_{2i} \cdot h^{2i}$$

In the middle portion of the specifications of lens system in Table 1, there are described in order from the left, values of the conical constant k, and the aspherical coefficients of second order, fourth order, sixth order, eighth order and tenth order, $A_2$, $A_4$, $A_6$, $A_8$ and $A_{10}$. $E_{-n}$ means $10^{-n}$ in the values of aspherical coefficients.

The lower portion in Table 1 shows gaps between lens groups and lens advance amounts for focusing, for each shooting distance of infinity and 890.0 mm at three zooming positions (F=36.0, 60.0, and 102.0 mm) between the wide-angle end and the telephoto end. The lens advance amount for focusing is different between focusing lens groups, and the ratio of moving distances is also different between the zooming positions.

Figure 1B:
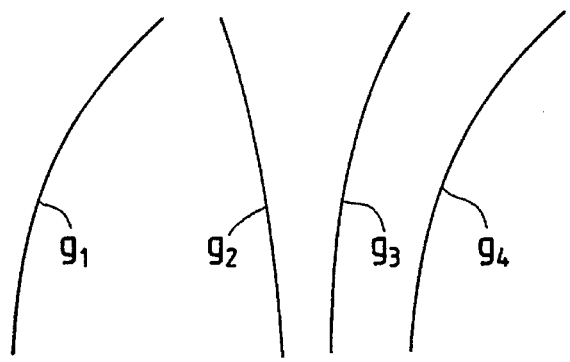
FIG. 1B is a drawing to show movement traces of lens groups in zooming.

FIG. 1B shows movement traces ($g_1$, $g_2$, $g_3$, $g_4$) of the lens groups during zooming with a variable of rotation angle of a rotating lens barrel.

Table 2 shows numerical values defining the movement traces. In Table 2, the left end column shows rotation angles θ (ANGLE) of the rotating barrel, the right end column focal lengths (F), and four columns between the two end columns movement amounts of the lens groups along the optical axis. As shown in the table, a rotation angle θ for zooming from the wideangle end to the telephoto end is set to 55° in the present embodiment.

TABLE 2

| ANGLE | (1) | (2) | (3) | (4) | F |
|---|---|---|---|---|---|
| .000 | .000 | .000 | .000 | .000 | 35.989 |
| 1.000 | .773 | −.327 | .394 | .773 | 37.601 |
| 2.000 | 1.521 | −.639 | .765 | 1.521 | 39.238 |
| 3.000 | 2.240 | −.935 | 1.116 | 2.240 | 40.890 |
| 4.000 | 2.931 | −1.211 | 1.451 | 2.931 | 42.548 |
| 5.000 | 3.593 | −1.466 | 1.772 | 3.592 | 44.203 |
| 6.000 | 4.225 | −1.700 | 2.082 | 4.224 | 45.847 |
| 7.000 | 4.827 | −1.912 | 2.382 | 4.827 | 47.472 |
| 8.000 | 5.402 | −2.102 | 2.674 | 5.402 | 49.072 |
| 9.000 | 5.948 | −2.272 | 2.958 | 5.948 | 50.641 |
| 10.000 | 6.468 | −2.424 | 3.235 | 6.468 | 52.180 |
| 11.000 | 6.966 | −2.565 | 3.502 | 6.966 | 53.700 |
| 12.000 | 7.445 | −2.697 | 3.760 | 7.445 | 55.210 |
| 13.000 | 7.907 | −2.825 | 4.009 | 7.907 | 56.721 |
| 14.000 | 8.355 | −2.952 | 4.248 | 8.355 | 58.240 |
| 15.000 | 8.791 | −3.080 | 4.477 | 8.791 | 59.777 |
| 16.000 | 9.215 | −3.210 | 4.697 | 9.215 | 61.335 |
| 17.000 | 9.626 | −3.340 | 4.909 | 9.626 | 62.906 |
| 18.000 | 10.024 | −3.466 | 5.115 | 10.024 | 64.47S |
| 19.000 | 10.406 | −3.586 | 5.316 | 10.406 | 66.031 |
| 20.000 | 10.773 | −3.696 | 5.512 | 10.773 | 67.561 |
| 21.000 | 11.123 | −3.797 | 5.706 | 11.123 | 69.053 |
| 22.000 | 11.455 | −3.886 | 5.896 | 11.455 | 70.498 |
| 23.000 | 11.769 | −3.965 | 6.080 | 11.769 | 71.888 |
| 24.000 | 12.063 | −4.040 | 6.254 | 12.063 | 73.223 |
| 25.000 | 12.336 | −4.114 | 6.414 | 12.336 | 74.507 |
| 26.000 | 12.589 | −4.189 | 6.559 | 12.589 | 75.740 |
| 27.000 | 12.823 | −4.267 | 6.689 | 12.823 | 76.928 |
| 28.000 | 13.038 | −4.348 | 6.805 | 13.038 | 78.075 |
| 29.000 | 13.238 | −4.433 | 6.907 | 13.238 | 79.186 |
| 30.000 | 13.424 | −4.520 | 6.999 | 13.424 | 80.266 |
| 31.000 | 13.597 | −4.611 | 7.080 | 13.597 | 81.318 |
| 32.000 | 13.759 | −4.704 | 7.152 | 13.759 | 82.349 |
| 33.000 | 13.911 | −4.800 | 7.216 | 13.911 | 83.362 |
| 34.000 | 14.055 | −4.899 | 7.273 | 14.055 | 84.360 |
| 35.000 | 14.191 | −5.000 | 7.324 | 14.191 | 85.349 |
| 36.000 | 14.320 | −5.104 | 7.370 | 14.320 | 66.331 |
| 37.000 | 14.444 | −5.208 | 7.413 | 14.444 | 87.305 |
| 38.000 | 14.563 | −5.314 | 7.452 | 14.563 | 88.270 |
| 39.000 | 14.677 | −5.418 | 7.489 | 14.677 | 89.226 |
| 40.000 | 14.786 | −5.522 | 7.524 | 14.786 | 90.169 |
| 41.000 | 14.890 | −5.625 | 7.557 | 14.890 | 91.100 |
| 42.000 | 14.990 | −5.726 | 7.589 | 14.990 | 92.016 |
| 43.000 | 15.086 | −5.826 | 7.620 | 15.086 | 92.917 |
| 44.000 | 15.179 | −5.922 | 7.650 | 15.179 | 93.801 |
| 45.000 | 15.267 | −6.017 | 7.680 | 15.267 | 94.666 |
| 46.000 | 15.352 | −6.108 | 7.70G | 15.352 | 95.512 |
| 47.000 | 15.433 | −6.197 | 7.737 | 15.433 | 96.336 |
| 48.000 | 15.510 | −6.282 | 7.785 | 15.510 | 97.138 |
| 49.000 | 15.584 | −6.364 | 7.792 | 15.584 | 97.915 |

TABLE 2-continued

| ANGLE | (1) | (2) | (3) | (4) | F |
|---|---|---|---|---|---|
| 50.000 | 15.655 | −6.443 | 7.819 | 15.655 | 98.668 |
| 51.000 | 15.722 | −5.518 | 7.846 | 15.722 | 99.393 |
| 52.000 | 15.786 | −6.589 | 7.871 | 15.786 | 100.091 |
| 53.000 | 15.846 | −6.657 | 7.896 | 15.846 | 100.759 |
| 54.000 | 15.903 | −6.721 | 7.921 | 15.903 | 101.395 |
| 55.000 | 15.956 | −6.781 | 7.944 | 15.956 | 102.000 |

Figure 1C:
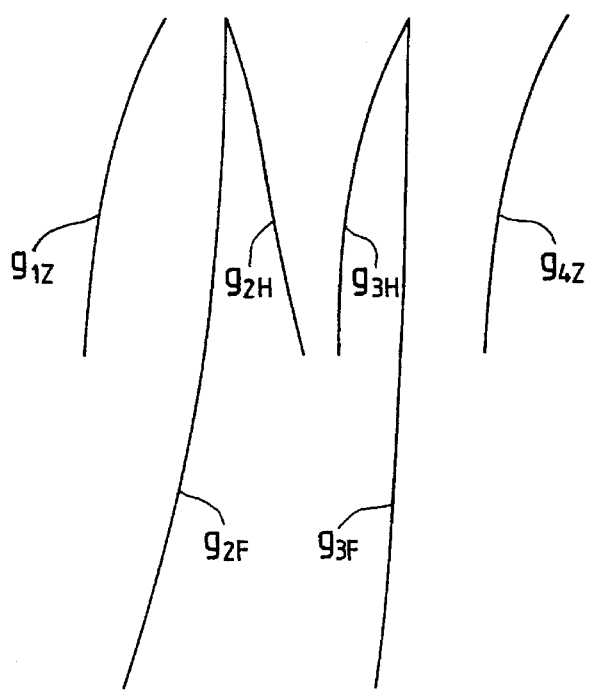
FIG. 1C is a drawing to show shapes of focus cams, zoom cams and compensating zoom cams to define zooming and focusing.

FIG. 1C shows cam shapes actually formed on the rotating barrel in the zoom lens according to the present invention. In FIG. 1C, $g_{2F}$ and $g_{3F}$ denote focus cams for the second lens group and for the third lens group, respectively, which are the focusing lens groups, and $g_{1Z}$ and $g_{4Z}$ the zoom cams for the first lens group and for the fourth lens group.

Further, $g_{2H}$ represents a compensating zoom cam for the second lens group, and $g_{3H}$ a compensating zoom cam common to the first, third and fourth lens groups.

During actual zooming, the movement traces $g_2$, $g_3$ of second and third lens groups which are the focusing lens groups, are formed by combinations of the focus cams $g_{2F}$, $g_{3F}$ with the compensating zoom cams $g_{2H}$, $g_{3H}$, respectively.

Also, the movement traces $g_1$, $g_4$ of first and fourth lens groups taking no part in focusing are formed by combinations of the zoom cams $g_{1Z}$, $g_{4Z}$ of first and fourth lens groups, respectively, with the compensating zoom cam $g_{3H}$.

Table 3 shows numerical values defining the cam traces of the focus cams $g_{2F}$, $g_{3F}$.

TABLE 3

| ANGLE | (2) | (3) | F | ANGLE | (2) | (3) | F |
|---|---|---|---|---|---|---|---|
| .000 | .000 | .000 | 35.989 | | | | |
| 1.000 | .000 | .000 | 37.601 | 56.000 | 1.839 | .386 | .000 |
| 2.000 | .001 | .000 | 39.238 | 57.000 | 1.959 | .431 | .000 |
| 3.000 | .001 | .000 | 40.890 | 58.000 | 2.084 | .477 | .000 |
| 4.000 | .001 | .000 | 42.548 | 59.000 | 2.212 | .524 | .000 |
| 5.000 | .002 | .000 | 44.203 | 60.000 | 2.342 | .571 | .000 |
| 6.000 | .003 | .000 | 45.847 | 61.000 | 2.472 | .617 | .000 |
| 7.000 | .004 | .000 | 47.472 | 62.000 | 2.601 | .661 | .000 |
| 8.000 | .006 | .000 | 49.072 | 63.000 | 2.728 | .703 | .000 |
| 9.000 | .008 | .000 | 50.641 | 64.000 | 2.851 | .742 | .000 |
| 10.000 | .011 | .000 | 52.180 | 65.000 | 2.971 | .778 | .000 |
| 11.000 | .014 | .000 | 53.700 | 66.000 | 3.090 | .812 | .000 |
| 12.000 | .018 | .000 | 55.210 | 67.000 | 3.211 | .846 | .000 |
| 13.000 | .023 | .000 | 56.721 | 68.000 | 3.336 | .881 | .000 |
| 14.000 | .029 | .000 | 58.240 | 69.000 | 3.466 | .920 | .000 |
| 15.000 | .035 | .000 | 59.777 | 70.000 | 3.606 | .963 | .000 |
| 16.000 | .042 | .000 | 61.335 | 71.000 | 3.755 | 1.012 | .000 |
| 17.000 | .050 | .000 | 62.906 | 72.000 | 3.914 | 1.065 | .000 |
| 18.000 | .059 | .000 | 64.475 | 73.000 | 4.079 | 1.122 | .000 |
| 19.000 | .069 | .001 | 66.031 | 74.000 | 4.248 | 1.181 | .000 |
| 20.000 | .081 | .001 | 67.561 | 75.000 | 4.419 | 1.240 | .000 |
| 21.000 | .095 | .001 | 69.053 | 76.000 | 4.588 | 1.297 | .000 |
| 22.000 | .110 | .001 | 70.498 | 77.000 | 4.754 | 1.351 | .000 |
| 23.000 | .127 | .001 | 71.888 | 78.000 | 4.915 | 1.401 | .000 |
| 24.000 | .146 | .002 | 73.223 | 79.000 | 5.071 | 1.448 | .000 |
| 25.000 | .167 | .002 | 74.507 | 80.000 | 5.223 | 1.491 | .000 |
| 26.000 | .190 | .002 | 75.740 | 81.000 | 5.372 | 1.532 | .000 |
| 27.000 | .214 | .003 | 76.928 | 82.000 | 5.519 | 1.571 | .000 |
| 28.000 | .240 | .004 | 78.075 | 83.000 | 5.664 | 1.608 | .000 |
| 29.000 | .287 | .005 | 79.186 | 84.000 | 5.809 | 1.644 | .000 |
| 30.000 | .295 | .006 | 80.266 | 85.000 | 5.953 | 1.679 | .000 |
| 31.000 | .325 | .007 | 81.318 | 86.000 | 6.097 | 1.715 | .000 |
| 32.000 | .356 | .009 | 82.349 | 87.000 | 6.243 | 1.751 | .000 |
| 33.000 | .388 | .011 | 83.362 | 88.000 | 6.390 | 1.788 | .000 |
| 34.000 | .421 | .013 | 84.360 | 89.000 | 6.541 | 1.826 | .000 |
| 35.000 | .455 | .016 | 85.349 | 90.000 | 6.694 | 1.866 | .000 |
| 36.000 | .491 | .019 | 86.331 | 91.000 | 6.852 | 1.909 | .000 |

TABLE 3-continued

| ANGLE | (2) | (3) | F | ANGLE | (2) | (3) | F |
|---|---|---|---|---|---|---|---|
| 37.000 | .527 | .022 | 87.305 | 92.000 | 7.013 | 1.953 | .000 |
| 38.000 | .565 | .026 | 88.270 | 93.000 | 7.178 | 2.000 | .000 |
| 39.000 | .604 | .031 | 89.225 | 94.000 | 7.346 | 2.049 | .000 |
| 40.000 | .646 | .037 | 90.169 | 95.000 | 7.517 | 2.100 | .000 |
| 41.000 | .690 | .044 | 91.100 | 96.000 | 7.692 | 2.153 | .000 |
| 42.000 | .737 | .053 | 92.016 | 97.000 | 7.869 | 2.208 | .000 |
| 43.000 | .786 | .062 | 92.917 | 98.000 | 8.049 | 2.264 | .000 |
| 44.000 | .839 | .074 | 93.801 | 99.000 | 8.231 | 2.321 | .000 |
| 45.000 | .896 | .087 | 94.666 | 100.000 | 8.416 | 2.380 | .000 |
| 46.000 | .956 | .102 | 95.512 | 101.000 | 8.602 | 2.440 | .000 |
| 47.000 | 1.021 | .118 | 96.336 | 102.000 | 8.790 | 2.501 | .000 |
| 48.000 | 1.090 | .138 | 97.138 | 103.000 | 8.980 | 2.563 | .000 |
| 49.000 | 1.164 | .159 | 97.915 | 104.000 | 9.171 | 2.626 | .000 |
| 50.000 | 1.243 | .183 | 98.668 | 105.000 | 9.364 | 2.690 | .000 |
| 51.000 | 1.327 | .209 | 99.393 | 106.000 | 9.557 | 2.754 | .000 |
| 52.000 | 1.417 | .239 | 100.091 | 107.000 | 9.752 | 2.819 | .000 |
| 53.000 | 1.513 | .271 | 100.759 | 108.000 | 9.946 | 2.884 | .000 |
| 54.000 | 1.615 | .306 | 101.395 | 109.000 | 10.142 | 2.949 | .000 |
| 55.000 | 1.723 | .345 | 102.000 | 110.000 | 10.337 | 3.015 | .000 |

In Table 3, the left end column and the fifth column show rotation angles θ (ANGLE) of the rotating barrel, the second and third columns and the sixth and seventh columns movement amounts of the second and third lens groups along the optical axis, and the fourth and eighth columns corresponding focal lengths (F). In the table, the rotation angle θ of the rotating barrel of the focus cams $g_{2F}$, $g_{3F}$ is set to 110°, which is a double of the rotation angle 55° for zooming. This is because the rotation angle for focusing is set to 55°, which is the same rotation angle as that for zooming. Thus, the rotation angle θ of the rotating barrel of the focus cams $g_{2F}$, $g_{3F}$ is 110° after the rotation angles for zooming and for focusing are combined with each other.

Figure 2:
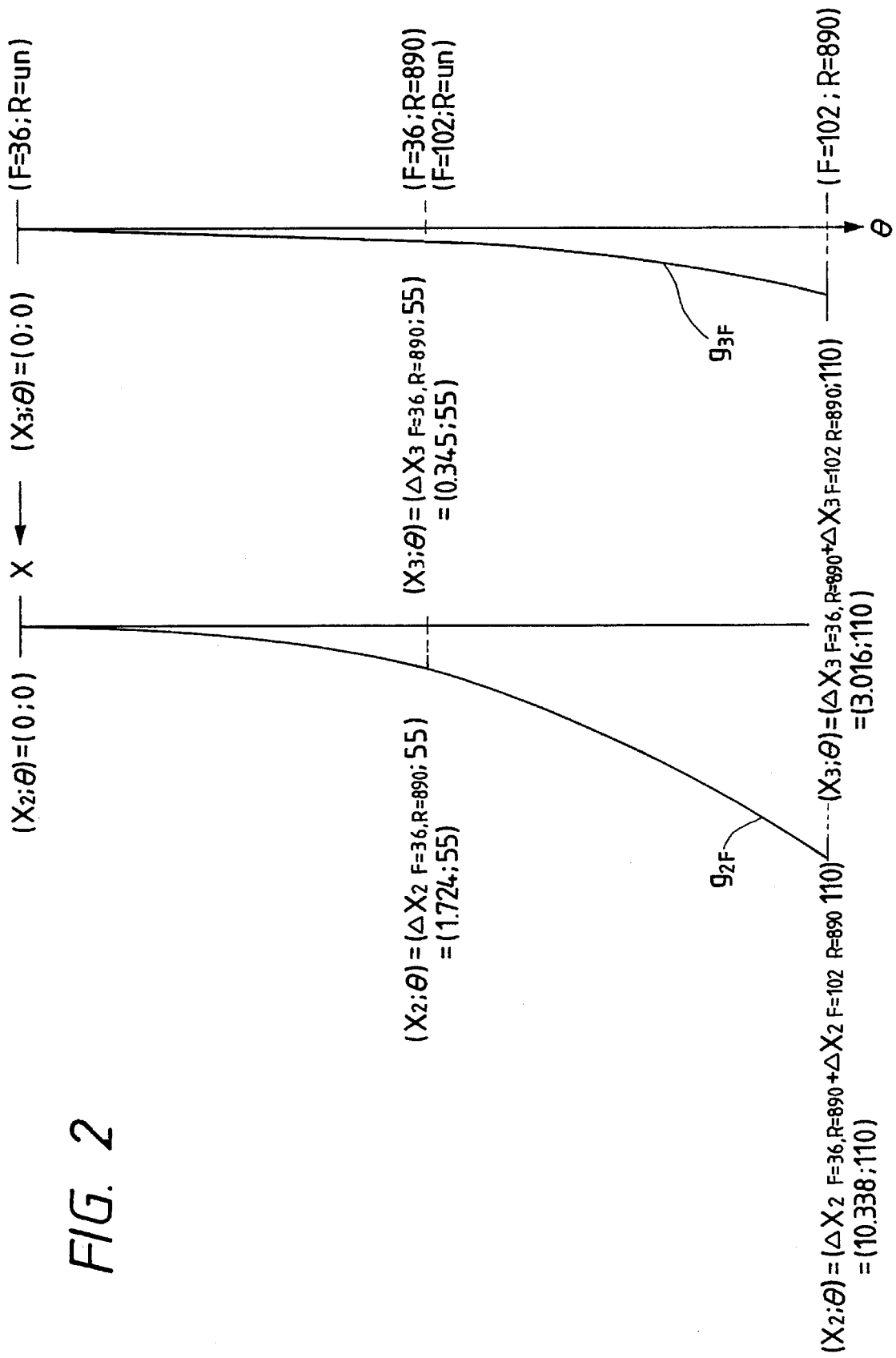
FIG. 2 is an explanatory drawing to illustrate how to determine focus cams in the zoom lens in Embodiment 1 according to the present invention.

Next described with reference to FIG. 2 is how to determine the focus cams. Since the rotation angle for focusing is set to 55°, which is identical to the rotation angle for zooming, the shape of focus cam $g_{2F}$, $g_{3F}$ is specifically a combination of the focus cam trace defining the advance amount for focusing at the wideangle end shown in Table 1 with the focusing cam trace defining the advance amount for focusing at the telephoto end. Suppose in FIG. 2 the advance amounts of the second and third lens groups for focusing are $\Delta X_{2\ F=36.\ R=890}$ and $\Delta X_{3\ F=36.\ R=890}$ at the wideangle end and $\Delta X_{2\ F=102.\ R=890}$ and $\Delta X_{3\ F=102.\ R=890}$ at the telephoto end, respectively. If coordinates for wideangle end infinity are ($X_2$; θ)=(0; 0) and ($X_3$; θ)=(0; 0) and if coordinates for wideangle end shooting distance R=890.0 mm are ($X_2$; θ)=($\Delta X_{2\ F=36.\ R=890}$; 55)=(1.724; 55) and ($X_3$; θ)=($\Delta X_{3\ F=36.\ R=890}$; 55)=(0.345; 55), coordinates for telephoto end infinity are ($X_2$; θ)=(1.724; 55) and ($X_3$; θ)=(0.345; 55) and coordinates for telephoto end shooting distance R=890.0 mm are ($X_2$; θ)=($\Delta X_{2\ F=36.\ R=890}+\Delta X_{2\ F=102.\ R=890}$;110)=(10.338; 110l) and ($X_3$; θ)=($\Delta X_{3\ F=36.\ R=890}+\Delta X_{3\ F=102.\ R=890}$; 110)= (3.016; 110). In FIG. 2, R=un means that the shooting distance is infinity. Further, the shape of focus cam $g_{2F}$, $g_{3F}$ except for the above three points is determined as shown in Table 3 by utilizing the optimization method or the like to obtain an advance amount for focusing necessary for arbitrary zooming position and shooting distance (for example, F=60.0 mm and R=890.0 mm).

Table 4 shows numerical values defining the cam traces of the zoom cams $g_{1Z}$, $g_{4Z}$ for the first lens group G1 and for the fourth lens group G4.

TABLE 4

| ANGLE | (1) | (4) | F |
|---|---|---|---|
| .000 | .000 | .000 | 35.989 |
| 1.000 | .379 | .379 | 37.601 |
| 2.000 | .756 | .756 | 39.238 |
| 3.000 | 1.124 | 1.124 | 40.890 |
| 4.000 | 1.480 | 1.480 | 42.548 |
| 5.000 | 1.821 | 1.821 | 44.203 |
| 6.000 | 2.143 | 2.143 | 45.847 |
| 7.000 | 2.445 | 2.445 | 47.472 |
| 8.000 | 2.728 | 2.728 | 49.072 |
| 9.000 | 2.990 | 2.990 | 50.641 |
| 10.000 | 3.234 | 3.234 | 52.180 |
| 11.000 | 3.464 | 3.464 | 53.700 |
| 12.000 | 3.685 | 3.685 | 55.210 |
| 13.000 | 3.898 | 3.898 | 56.721 |
| 14.000 | 4.107 | 4.107 | 58.240 |
| 15.000 | 4.314 | 4.313 | 59.777 |
| 16.000 | 4.518 | 4.518 | 61.335 |
| 17.000 | 4.718 | 4.718 | 62.906 |
| 18.000 | 4.910 | 4.910 | 64.475 |
| 19.000 | 5.091 | 5.091 | 66.031 |
| 20.000 | 5.261 | 5.261 | 67.561 |
| 21.000 | 5.418 | 5.418 | 69.053 |
| 22.000 | 5.560 | 5.560 | 70.498 |
| 23.000 | 5.691 | 5.691 | 71.888 |
| 24.000 | 5.811 | 5.811 | 73.223 |
| 25.000 | 5.925 | 5.925 | 74.507 |
| 26.000 | 6.033 | 6.033 | 75.740 |
| 27.000 | 6.137 | 6.137 | 76.928 |
| 28.000 | 6.238 | 6.238 | 78.075 |
| 29.000 | 6.336 | 6.336 | 79.186 |
| 30.000 | 6.431 | 6.431 | 80.266 |
| 31.000 | 6.525 | 6.525 | 81.318 |
| 32.000 | 6.616 | 6.616 | 82.349 |
| 33.000 | 6.706 | 6.706 | 83.362 |
| 34.000 | 6.795 | 6.795 | 84.360 |
| 35.000 | 6.882 | 6.882 | 85.349 |
| 36.000 | 6.969 | 6.969 | 86.331 |
| 37.000 | 7.054 | 7.054 | 87.305 |
| 38.000 | 7.137 | 7.137 | 88.270 |
| 39.000 | 7.219 | 7.219 | 89.226 |
| 40.000 | 7.299 | 7.299 | 90.169 |
| 41.000 | 7.377 | 7.377 | 91.100 |
| 42.000 | 7.454 | 7.454 | 92.015 |
| 43.000 | 7.529 | 7.529 | 92.917 |
| 44.000 | 7.602 | 7.602 | 93.801 |
| 45.000 | 7.674 | 7.674 | 94.666 |
| 46.000 | 7.745 | 7.744 | 95.512 |
| 47.000 | 7.814 | 7.814 | 96.336 |
| 48.000 | 7.883 | 7.883 | 97.138 |
| 49.000 | 7.951 | 7.951 | 97.915 |
| 50.000 | 8.018 | 8.018 | 98.668 |
| 51.000 | 8.086 | 8.086 | 99.393 |
| 52.000 | 8.153 | 8.153 | 100.091 |
| 53.000 | 8.220 | 8.220 | 100.759 |
| 54.000 | 8.288 | 8.288 | 101.395 |
| 55.000 | 8.357 | 8.357 | 102.000 |

In Table 4, the left end column shows rotation angles θ (ANGLE) of the rotating barrel, the right end column corresponding focal lengths (F), and two columns between the two end columns movement amounts of the first and fourth lens groups along the optical axis. Since the first lens group G1 and the fourth lens group G4 move together in the present embodiment, the cam traces thereof take the same numerical values. The rotation angle θ for zooming from the wideangle end to the telephoto end is set to 55° identical to that in Table 2.

Table 5 shows numerical values defining the cam trace of the compensating zoom cam $g_{2H}$ for the second lens group and the cam trace of the compensating zoom cam $g_{3H}$ common to the first, third and fourth lens groups.

TABLE 5

| ANGLE | (2) | (3) | F |
|---|---|---|---|
| .000 | .000 | .000 | 35.989 |
| 1.000 | −.327 | .394 | 37.601 |
| 2.000 | −.640 | .765 | 39.238 |
| 3.000 | −.936 | 1.116 | 40.890 |
| 4.000 | −1.212 | 1.451 | 42.548 |
| 5.000 | −1.468 | 1.772 | 44.203 |
| 6.000 | −1.702 | 2.082 | 45.847 |
| 7.000 | −1.916 | 2.382 | 47.472 |
| 8.000 | −2.108 | 2.674 | 49.072 |
| 9.000 | −2.280 | 2.958 | 50.641 |
| 10.000 | −2.435 | 3.235 | 52.180 |
| 11.000 | −2.579 | 3.502 | 53.700 |
| 12.000 | −2.715 | 3.760 | 55.210 |
| 13.000 | −2.848 | 4.009 | 56.721 |
| 14.000 | −2.980 | 4.248 | 58.240 |
| 15.000 | −3.115 | 4.477 | 59.777 |
| 16.000 | −3.252 | 4.697 | 61.335 |
| 17.000 | −3.390 | 4.909 | 62.906 |
| 18.000 | −3.525 | 5.114 | 64.475 |
| 19.000 | −3.655 | 5.315 | 66.031 |
| 20.000 | −3.778 | 5.512 | 67.561 |
| 21.000 | −3.892 | 5.705 | 69.053 |
| 22.000 | −3.996 | 5.895 | 70.498 |
| 23.000 | −4.093 | 6.079 | 71.888 |
| 24.000 | −4.187 | 6.252 | 73.223 |
| 25.000 | −4.281 | 6.412 | 74.507 |
| 26.000 | −4.379 | 6.556 | 75.740 |
| 27.000 | −4.481 | 6.686 | 76.928 |
| 28.000 | −4.588 | 6.801 | 78.075 |
| 29.000 | −4.699 | 6.903 | 79.186 |
| 30.000 | −4.815 | 6.993 | 80.266 |
| 31.000 | −4.936 | 7.072 | 81.318 |
| 32.000 | −5.060 | 7.143 | 82.349 |
| 33.000 | −5.189 | 7.205 | 83.362 |
| 34.000 | −5.321 | 7.260 | 84.360 |
| 35.000 | −5.456 | 7.308 | 85.349 |
| 36.000 | −5.594 | 7.352 | 86.331 |
| 37.000 | −5.735 | 7.391 | 87.305 |
| 38.000 | −5.878 | 7.426 | 88.270 |
| 39.000 | −6.023 | 7.458 | 89.226 |
| 40.000 | −6.168 | 7.487 | 90.169 |
| 41.000 | −6.315 | 7.513 | 91.100 |
| 42.000 | −6.463 | 7.536 | 92.016 |
| 43.000 | −6.612 | 7.558 | 92.917 |
| 44.000 | −6.762 | 7.577 | 93.801 |
| 45.000 | −6.913 | 7.593 | 94.666 |
| 45.000 | −7.065 | 7.607 | 95.512 |
| 47.000 | −7.218 | 7.619 | 96.336 |
| 48.000 | −7.372 | 7.627 | 97.138 |
| 49.000 | −7.528 | 7.633 | 97.215 |
| 50.000 | −7.685 | 7.636 | 98.668 |
| 51.000 | −7.845 | 7.636 | 99.393 |
| 52.000 | −8.006 | 7.633 | 100.091 |
| 53.000 | −8.170 | 7.626 | 100.759 |
| 54.000 | −8.336 | 7.615 | 101.395 |
| 55.000 | −8.505 | 7.600 | 102.000 |

In Table 5, the left end column shows rotation angles θ (ANGLE) of the rotating barrel, the second and third columns movement amounts of the second lens group along the optical axis and of the first, third and fourth lens groups along the optical axis, respectively, and the right end column corresponding focal lengths (F).

In the present embodiment, in zooming, the movement traces $g_2$, $g_3$ of the second and third lens groups which are the focusing lens groups are formed by combinations of the focus cams $g_{2F}$, $g_{3F}$ with the compensating zoom cams $g_{2H}$, $g_{3F}$, respectively, and the movement traces $g_1$, $g_4$ of the first and fourth lens groups taking no part in focusing are formed by combinations of the zoom cams $g_{1Z}$, $g_{4Z}$ for the first and fourth lens groups, respectively, with the compensating zoom cam $g_{3H}$. Therefore, if the movement amounts along the optical axis in Table 3 and Table 4 are added to the movement amounts along the optical axis in Table 5 in correspondence with each other, the sums should correspond to the movement amounts along the optical axis in Table 2.

In focusing, the second lens group and the third lens group, which are focusing lens groups, move by the same rotation angle on the focus cams $g_{2F}$, $g_{3F}$ thereby to achieve focusing. Table 6 shows rotation angles of rotating barrel for focusing with shooting distance R=0.89, 1.2, 1.5, 2.0, 3.0 m at respective zooming positions of focal length F=36, 50, 60, 70, 85, 102 mm in actual focusing with the focus cams of Table 3, actual advance amounts (DX) of the focusing lens groups in correspondence with the rotation angles, and displacement amounts (BF) of an image point with the advance amounts (DX) given.

TABLE 6

| | R | 890.00 | 1200.00 | 1500.00 | 2000.00 | 3000.00 |
|---|---|---|---|---|---|---|
| F 35.989 | BF | .000 | .066 | .065 | .074 | .079 |
| F 50.000 | BF | .000 | .086 | .089 | .081 | .017 |
| F 60.000 | BF | .000 | .022 | .026 | .047 | −.037 |
| F 70.000 | BF | .000 | .077 | .026 | .032 | −.051 |
| F 85.000 | BF | .000 | −.049 | −.073 | .005 | −.066 |
| F 102.000 | BF | .000 | .000 | −.038 | .000 | −.053 |
| ANGLE | DX | 55.000 | 47.718 | 43.068 | 37.296 | 30.840 |
| F 35.989 | DX | .000 | 1.723 | .345 | .000 | R 890.00 |
| F 50.000 | DX | .000 | 2.794 | .726 | .000 | R 890.00 |
| F 60.000 | DX | .000 | 3.591 | .969 | .000 | R 890.00 |
| F 70.000 | DX | .000 | 4.592 | 1.332 | .000 | R 890.00 |
| F 85.000 | DX | .000 | 6.196 | 1.837 | .000 | R 890.00 |
| F 102.000 | DX | .000 | 8.614 | 2.670 | .000 | R 890.00 |
| F 35.989 | DX | .000 | 1.070 | .132 | .000 | R 1200.00 |
| F 50.000 | DX | .000 | 1.868 | .400 | .000 | R 1200.00 |
| F 60.000 | DX | .000 | 2.675 | .697 | .000 | R 1200.00 |
| F 70.000 | DX | .000 | 3.412 | .934 | .000 | R 1200.00 |
| F 85.000 | DX | .000 | 5.129 | 1.570 | .000 | R 1200.00 |
| F 102.000 | DX | .000 | 7.203 | 2.201 | .000 | R 1200.00 |
| F 35.989 | DX | .000 | .790 | .063 | .000 | R 1500.00 |
| F 50.000 | DX | .000 | 1.379 | .228 | .000 | R 1500.00 |
| F 60.000 | DX | .000 | 2.075 | .486 | .000 | R 1500.00 |
| F 70.000 | DX | .000 | 2.833 | .767 | .000 | R 1500.00 |
| F 85.000 | DX | .000 | 4.426 | 1.373 | .000 | R 1500.00 |
| F 102.000 | DX | .000 | 6.338 | 1.923 | .000 | R 1500.00 |
| F 35.989 | DX | .000 | .538 | .023 | .000 | R 2000.00 |
| F 50.000 | DX | .000 | .943 | .100 | .000 | R 2000.00 |
| F 60.000 | DX | .000 | 1.423 | .252 | .000 | R 2000.00 |
| F 70.000 | DX | .000 | 2.101 | .520 | .000 | R 2000.00 |
| F 85.000 | DX | .000 | 3.461 | 1.047 | .000 | R 2000.00 |
| F 102.000 | DX | .000 | 5.338 | 1.622 | .000 | R 2000.00 |
| F 35.989 | DX | .000 | .320 | .007 | .000 | R 3000.00 |
| F 50.000 | DX | .000 | .615 | .034 | .000 | R 3000.00 |
| F 60.000 | DX | .000 | .920 | .101 | .000 | R 3000.00 |
| F 70.000 | DX | .000 | 1.359 | .253 | .000 | R 3000.00 |
| F 85.000 | DX | .000 | 2.586 | .779 | .000 | R 3000.00 |
| F 102.000 | DX | .000 | 4.350 | 1.365 | .000 | R 3000.00 |

The upper section of Table 6 shows the displacement amounts (BF) of an image point for the shooting distances R at each zooming position, and the middle section the rotation angles of the rotating barrel for the shooting distances R. Further, the lower section shows the actual advance amounts (DX) of the focusing lens groups in correspondence with the focusing rotation angles for each case of shooting distance R=0.89, 1.2, 1.5, 2.0, 3.0 m at each zooming position of focal length F=36, 50, 60, 70, 85, 102 mm. In the lower section, numerical values in the left end column represent overall focal lengths F, those in the right end column shooting distances R, and those between the two end columns actual advance amounts (DX) of the first lens group, the second lens group, the third lens group, and the fourth lens group in this order from the left. When a lens moves toward the object, the sign is positive for any value in Table 6.

It is seen from Table 6 that the displacement amount of the image point is small for any combination of focal length and shooting distance and is within the depth of focus at any zooming position and at any shooting distance. Namely, the manual focus is enabled in the floating-type inner focus zoom lens by the second lens group and the third lens group.

The present embodiment is excellent not only in performance in the entire zooming range in shooting at the infinite focus position, but also in imaging performance with less change in aberration in shooting at the closest focus position.

In the present embodiment, the movement traces $g_1$, $g_4$ of the first lens group and the fourth lens group taking no part in focusing are formed by combining the zoom cams $g_{1Z}$, $g_{4Z}$ of the first lens group and the fourth lens group, respectively, with the compensating zoom cam $g_{3H}$. It is also possible that the movement traces $g_1$, $g_4$ are formed by combining the zoom cams $g_{1Z}$, $g_{4Z}$ with the compensating zoom cam $g_{2H}$ for the second lens group.

In this case, the shape of zoom cam $g_{1Z}$, $g_{4Z}$ of the first or the fourth lens group is of course different from that in Table 4. Table 7 shows the shape of zoom cam $g_{1Z}$, $g_{4Z}$ as combined with the compensating zoom cam $g_{2H}$.

TABLE 7

| ANGLE | (1) | (4) | F |
| --- | --- | --- | --- |
| .000 | .000 | .000 | 35.989 |
| 1.000 | 1.100 | 1.100 | 37.601 |
| 2.000 | 2.161 | 2.160 | 39.238 |
| 3.000 | 3.176 | 3.176 | 40.890 |
| 4.000 | 4.143 | 4.143 | 42.548 |
| 5.000 | 5.060 | 5.060 | 44.203 |
| 6.000 | 5.927 | 5.927 | 45.847 |
| 7.000 | 6.743 | 6.743 | 47.472 |
| 8.000 | 7.510 | 7.510 | 49.072 |
| 9.000 | 8.228 | 8.228 | 50.641 |
| 10.000 | 8.904 | 8.904 | 52.180 |
| 11.000 | 9.545 | 9.545 | 53.700 |
| 12.000 | 10.160 | 10.160 | 55.210 |
| 13.000 | 10.755 | 10.755 | 56.721 |
| 14.000 | 11.336 | 11.336 | 58.240 |
| 15.000 | 11.905 | 11.905 | 59.777 |
| 16.000 | 12.467 | 12.467 | 61.335 |
| 17.000 | 13.016 | 13.016 | 62.906 |
| 18.000 | 13.549 | 13.549 | 64.475 |
| 19.000 | 14.061 | 14.061 | 66.031 |
| 20.000 | 14.550 | 14.550 | 67.561 |
| 21.000 | 15.014 | 15.014 | 69.053 |
| 22.000 | 15.451 | 15.451 | 70.498 |
| 23.000 | 15.862 | 15.862 | 71.888 |
| 24.000 | 16.250 | 16.250 | 73.223 |
| 25.000 | 16.618 | 16.618 | 74.507 |
| 26.000 | 16.968 | 16.968 | 75.740 |
| 27.000 | 17.304 | 17.304 | 76.928 |
| 28.000 | 17.626 | 17.626 | 78.075 |
| 29.000 | 17.938 | 17.938 | 79.186 |
| 30.000 | 18.239 | 18.239 | 80.266 |
| 31.000 | 18.533 | 18.533 | 81.318 |
| 32.000 | 18.819 | 18.819 | 82.349 |
| 33.000 | 19.100 | 19.099 | 83.362 |
| 34.000 | 19.375 | 19.375 | 84.360 |
| 35.000 | 19.647 | 19.647 | 85.349 |
| 35.000 | 19.915 | 19.915 | 86.331 |
| 37.000 | 20.180 | 20.180 | 87.305 |
| 38.000 | 20.441 | 20.441 | 88.270 |
| 39.000 | 20.699 | 20.699 | 89.226 |
| 40.000 | 20.954 | 20.954 | 90.169 |
| 41.000 | 21.205 | 21.205 | 91.100 |
| 42.000 | 21.453 | 21.453 | 92.016 |
| 43.000 | 21.698 | 21.698 | 92.917 |
| 44.000 | 21.940 | 21.940 | 93.801 |
| 45.000 | 22.180 | 22.180 | 94.666 |
| 46.000 | 22.416 | 22.416 | 95.512 |
| 47.000 | 22.650 | 22.650 | 96.336 |
| 48.000 | 22.882 | 22.882 | 97.138 |
| 49.000 | 23.112 | 23.112 | 97.915 |
| 50.000 | 23.340 | 23.340 | 98.668 |
| 51.000 | 23.567 | 23.567 | 99.393 |
| 52.000 | 23.792 | 23.792 | 100.091 |

TABLE 7-continued

| ANGLE | (1) | (4) | F |
| --- | --- | --- | --- |
| 53.000 | 24.016 | 24.016 | 100.759 |
| 54.000 | 24.239 | 24.239 | 101.395 |
| 55.000 | 24.461 | 24.461 | 102.000 |

Figure 3:
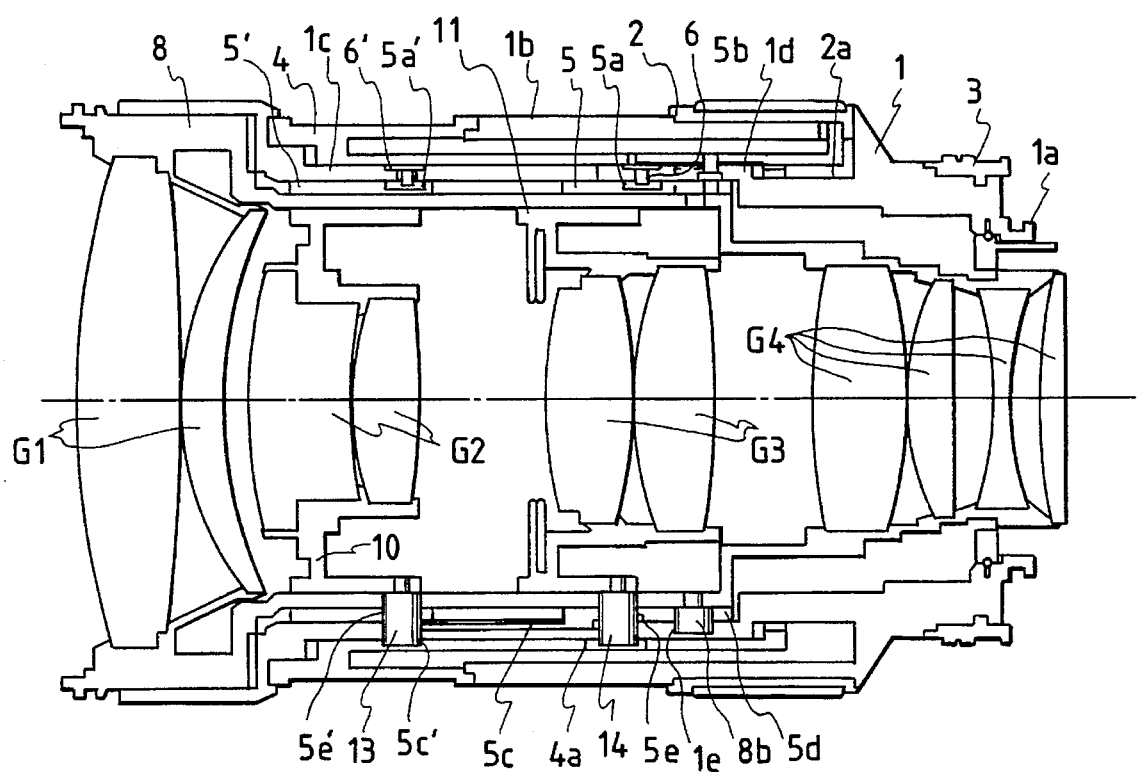
FIG. 3 is a vertical cross section of an embodiment of zoom lens barrel according to the present invention.
Figure 4A:
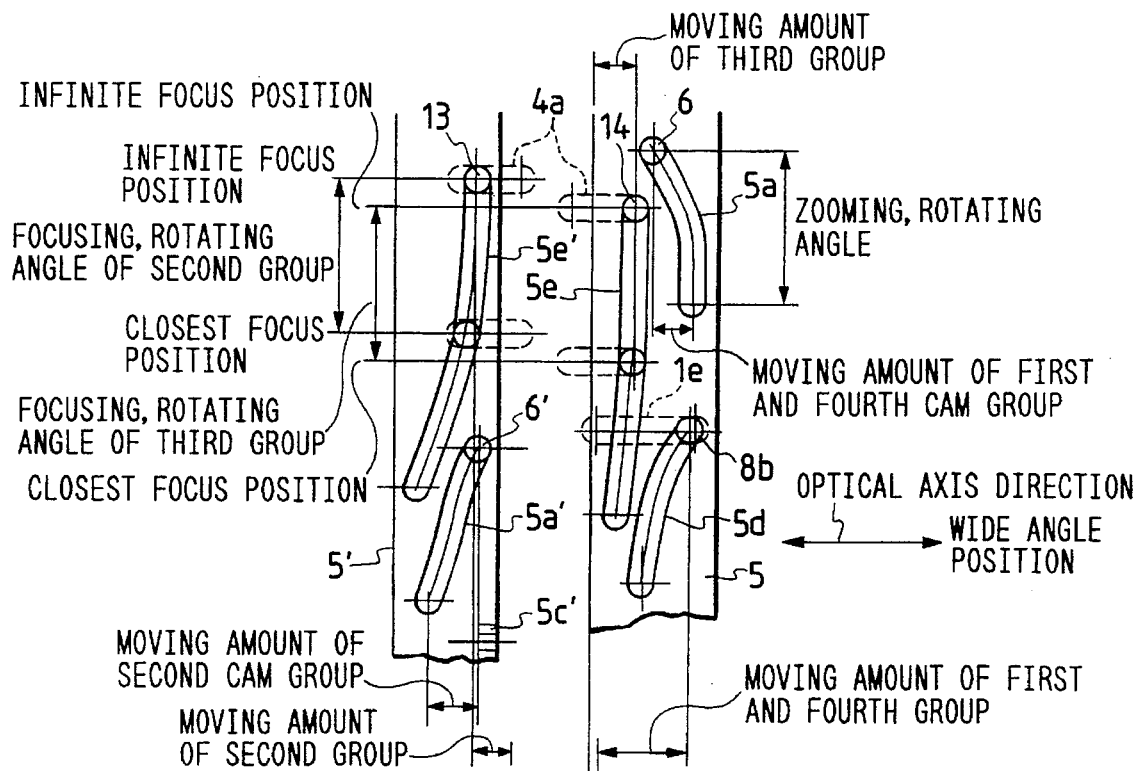
FIGS. 4A and 4B are expanded views to show cam grooves and guide grooves in the embodiment of the zoom lens barrel according to the present invention.
Figure 4B:
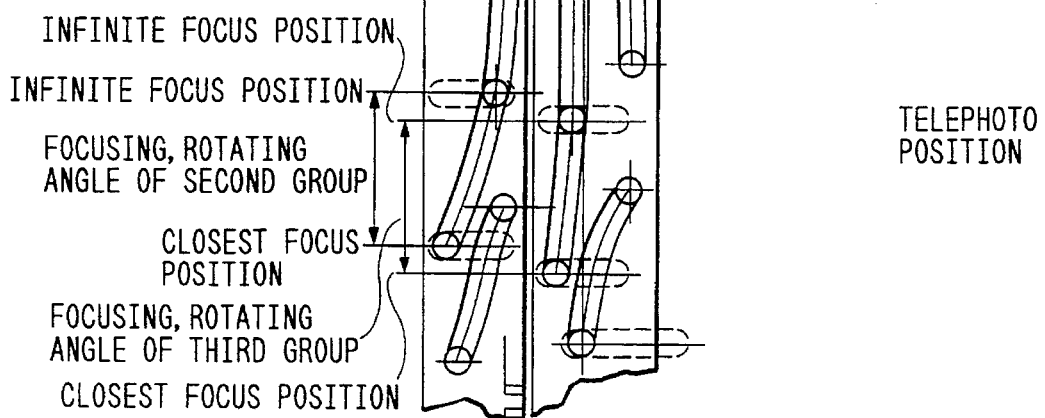

Next described with FIG. 3 and FIGS. 4A, 4B is an embodiment of zoom lens barrel corresponding to the optical system in Embodiment 1.

Reference numeral 1 denotes a stationary barrel, which is integrally provided with a mount portion 1a through which the lens barrel is mounted onto a camera body (not shown), at the end portion thereof on the camera body side. A zoom ring 2 and a stop ring 3 are fit on the outer peripheral portion of a large diameter portion 1b of the stationary barrel 1 as being rotatable in a certain angle range. A distance ring 4 is fit on the outer peripheral portion of a small diameter portion 1c of the stationary barrel 1 as being rotatable in a certain angle range.

A cam ring 5 and a cam ring 5' are fit on the inner peripheral portion of the small diameter portion 1c of the stationary barrel 1 as being rotatable in a certain angle range and movable in a certain distance range along the optical axis. A cam groove 5a, which is the first compensating zoom cam as described above, is formed in the cam ring 5, and a cam groove 5a', which is the second compensating zoom cam, is formed in the cam ring 5'. A cam pin 6 and a cam pin 6' planted into the inner peripheral surface of the small diameter portion 1c of the stationary barrel 1 are respectively fit into the cam groove 5a and the cam groove 5a'. An interlocking pin 5b is planted in the cam ring 5 to extend radially outward through a clearance groove 1d in the stationary barrel 1 and then to engage with an interlocking key 2a extending along the optical axis on the inner peripheral portion of the zoom ring 2. Further, a key portion 5c extending in the direction of the optical axis is provided at the left end of cam ring 5 and engages with a protrusion 5c' provided on the outer peripheral portion of cam ring 5'. Accordingly, the cam ring 5 and the cam ring 5' rotate together with the zoom ring 2 in the rotational direction.

A first lens group holding frame 8 holding the first lens group G1 and the fourth lens group G4 is fit on the inner peripheral portions of the cam ring 5 and the cam ring 5'. A cam pin 8b is planted in the outer peripheral portion of the first lens group holding frame 8. The tip portion of the cam pin 8b passes through the cam groove 5d in the cam ring 5 and is fit into a guide groove 1e formed in the small diameter portion 1c of the stationary barrel 1, so that the first lens group holding frame 8 may linearly move in a certain length range along the optical axis.

A second lens group holding frame 10 and a third lens group holding frame 11 are fit in the inner peripheral portion of the first lens group holding frame 8. A cam pin 13 is planted in the outer peripheral portion of the second lens group holding frame 10, penetrates through the first lens group holding frame 8, is fit into a cam groove 5e', which is the focus cam for the second lens group G2, formed in the cam ring 5', further penetrates through a clearance groove formed in the small diameter portion 1c of the stationary barrel 1, and is fit into a guide groove 4a formed in the internal cylindrical portion of the distance ring 4 in parallel with the optical axis. Similarly, a cam pin 14 is planted in the outer peripheral portion of the third lens group holding barrel 11, penetrates through the first lens group holding frame 8, is fit into a cam groove 5e, which is the focus cam of the third lens group G3, formed in the cam ring 5, further penetrates through a clearance groove formed in the small diameter portion 1c of the stationary barrel 1, and is fit into the guide groove 4a formed in the inner cylindrical portion of the distance ring 4 in parallel with the optical axis.

Description of the Operation of Lens Barrel

Next described is the operation of the lens barrel having the above-described structure.

The zooming operation is first described.

When the zoom ring 2 is rotated, the cam ring 5 is also rotated through the interlocking key 2a and the interlocking pin 5b. Then the cam ring 5 is moved along the optical axis while rotated along the compensating zoom cam of cam groove 5a by the cam pin 6 planted in the small diameter portion 1c of the stationary barrel 1. Since the cam ring 5' is incorporated with the cam ring 5 in the rotational direction through the engagement between the key portion 5c and the protrusion 5c', the cam ring 5' is also rotated at the same time. When the cam ring 5' is rotated, it is moved along the optical axis while rotated along the second compensating zoom cam of cam groove 5a' by the cam pin 6' planted in the small diameter portion 1c of the stationary barrel 1. 10 When the cam ring 5 is moved along the optical axis while rotated, the first lens group holding frame 8 moves along the zoom cam of cam groove 5d formed in the cam ring 5 through the cam pin 8b planted in the outer peripheral portion thereby to linearly move along the optical axis while guided by the guide groove 1e of the stationary barrel 1. Similarly, with the planted cam pin 14 moving along the focus cam of cam groove 5e formed in the cam ring 5, the third lens group holding frame 11 is moved along the optical axis while guided by the guide groove 4a formed in the inner cylindrical portion of the stationary distance ring 4 in parallel with the optical axis.

Further, with the planted cam pin 13 moving along the focus cam of cam groove 5e' formed in the cam ring 5', the second lens group holding frame 10 is linearly moved along the optical axis similarly as guided by the guide groove 4a formed in the inner cylindrical portion of the stationary distance ring 4 in parallel with the optical axis.

An amount of movement of the first lens group holding frame 8 along the optical axis is a sum of the compensating zoom cam of cam groove 5a and the zoom cam of cam groove 5d in the cam ring 5. Also, an amount of movement of the third lens group holding frame 11 along the optical axis is a sum of the compensating zoom cam of cam groove 5a and the focus cam of cam groove 5e in the cam ring 5. Further, an amount of movement of the second lens group holding frame 11 is a sum of the compensating zoom cam of cam groove 5a' and the focus cam of cam groove 5e' in the cam ring 5'.

The focusing operation is next described.

Since the cam pin 13 planted in the second lens group holding frame 10 and the cam pin 14 planted in the outer peripheral portion of the third lens group holding frame 11 are fit in the guide groove 4a parallel to the optical axis in the inner cylindrical portion, and since the cam pins 13, 14 are fit into the cam groove 5e' of the stationary cam ring 5' and the cam groove 5e of the stationary cam ring 5, respectively, with rotation of the distance ring 4 the third lens group holding frame 11 and the second lens group holding frame 10 are moved along the optical axis while rotated along the focus cam of cam groove 5e and the focus cam of cam groove 5e', respectively.

The above operation provides the movement traces of the second lens group and the third lens group in focusing as shown in the drawings described above.

Although the compensating zoom cams 5a and 5a' are separately provided in the cam ring 5 and the cam ring 5', respectively, in the present embodiment, they both may be arranged in the stationary barrel 1.

Embodiment 2

Figure 5A:
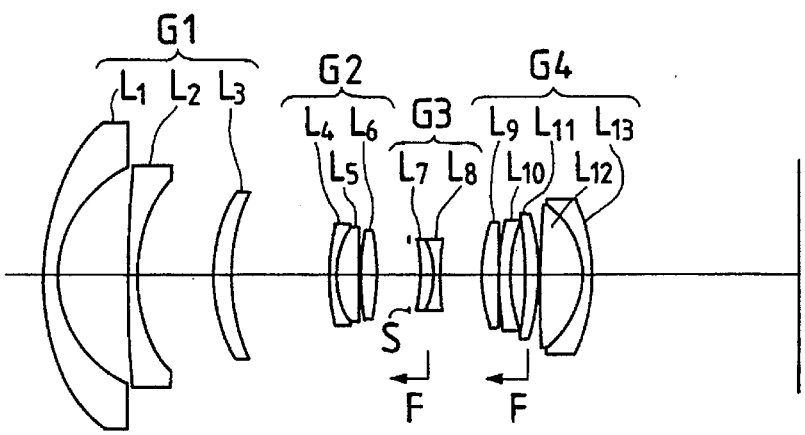
FIG. 5A is a diagram to show the lens structure of a zoom lens in Embodiment 2 according to the present invention.

In Embodiment 2, as shown in FIG. 5A, a zoom lens is composed, in order from the object side, of a first lens group G1 of negative refracting power, a second lens group G2 of positive refracting power, a third lens group G3 of negative refracting power, and a fourth lens group G4 of positive refracting power. All the lens groups move along the optical axis for zooming from wideangle to telephoto such that an air gap decreases between the first lens group G1 and the second lens group G2, an air gap increases between the second lens group G2 and the third lens group G3, and an air gap decreases between the third lens group G3 and the fourth lens group G4. Also, the third lens group G3 and the fourth lens group G4 move independently of each other toward the object along the optical axis for focusing.

The construction of each lens group is as follows. The first lens group G1 of negative refracting power is composed of a negative meniscus lens $L_1$ convex toward the object, a negative meniscus lens $L_2$ similarly convex toward the object, and a positive meniscus lens $L_3$ convex toward the object. The second lens group G2 of positive refracting power is composed of a negative meniscus lens $L_4$ convex toward the object, a positive lens $L_5$ cemented therewith, and a double convex positive lens $L_6$. The third lens group G3 of negative refracting power is composed of a positive meniscus lens $L_7$ convex toward the image and a negative lens $L_8$ cemented therewith. The fourth lens group G4 of positive refracting power is composed of a double convex positive lens $L_9$, a negative meniscus lens $L_{10}$ convex toward the object, a positive meniscus lens $L_{11}$ convex toward the image, a positive lens $L_{12}$ with stronger curvature surface on the image side, and a negative meniscus lens $L_{13}$ cemented therewith. An aperture stop S is provided on the object side of the third lens group G3 and incorporated with the third lens group G3.

Table 8 shows specifications of the zoom lens of Embodiment 2. In tables of specifications in embodiments, F represents a focal length (mm) and f an f-number.

TABLE 8

| F = 16.4–27.3 | | f = 4.1 | |
|---|---|---|---|
| r1 = 56.830 | d1 = 2.500 | n1 = 1.79668 | v1 = 45.4 L1 |
| r2 = 22.588 | d2 = 13.000 | | |
| r3 = 203.139 | d3 = 2.000 | n2 = 1.84042 | v2 = 43.3 L2 |
| r4 = 29.159 | d4 = 14.200 | | |
| r5 = 29.712 | d5 = 3.500 | n3 = 1.80458 | v3 = 25.5 L3 |
| r6 = 37.859 | d6 = 18.553 | | |
| r7 = 35.294 | d7 = 1.300 | n4 = 1.80384 | v4 = 33.9 L4 |
| r8 = 16.316 | d8 = 4.000 | n5 = 1.48749 | v5 = 70.2 L5 |
| r9 = 160.741 | d9 = .200 | | |
| r10 = 35.749 | d10 = 3.000 | n6 = 1.60342 | v6 = 38.1 L6 |
| r11 = −53.604 | d11 = 6.281 | | |
| r12 = .000 | d12 = 2.000 | | |
| r13 = −30.014 | d13 = 2.500 | n7 = 1.69911 | v7 = 27.8 L7 |
| r14 = −12.979 | d14 = 1.500 | n8 = 1.64000 | v8 = 60.0 L8 |
| r15 = 141.312 | d15 = 7.721 | | |
| r16 = 29.674 | d16 = 3.500 | n9 = 1.51823 | v9 = 59.0 L9 |
| r17 = −229.981 | d17 = .100 | | |
| r18 = 92.266 | d18 = 2.000 | n10 = 1.79504 | v10 = 28.6 L10 |
| r19 = 28.825 | d19 = 2.500 | | |
| r20 = −150.071 | d20 = 3.000 | n11 = 1.60300 | v11 = 65.5 L11 |
| r21 = −34.756 | d21 = .100 | | |
| r22 = 205.091 | d22 = 8.000 | n12 = 1.67025 | v12 = 57.6 L12 |

TABLE 8-continued

| r23 = −15.837 | d23 = 1.800 | n13 = 1.86074 | v13 = 23.0 L13 |
| r24 = −34.904 | d24 = 39.789 | | | r1 = .1000E+01  .0000
.4178E−05  .3656E−09  −.9816E−12  .2197E−14

|     | pos(1) | pos(2) | pos(3) | pos(4) | pos(5) | pos(6) |
| --- | --- | --- | --- | --- | --- | --- |
| f & b | 16.400 | 24.000 | 27.300 | −.044 | −.062 | −.069 |
| d0  | .000 | .000 | .000 | 356.955 | 363.355 | 363.202 |
| d6  | 18.553 | 4.145 | .916 | 18.553 | 4.145 | .916 |
| d11 | 6.282 | 11.087 | 13.115 | 6.274 | 8.713 | 9.508 |
| d15 | 7.721 | 2.916 | .888 | 6.941 | 3.132 | 2.090 |
| d24 | 39.789 | 47.797 | 51.178 | 40.578 | 49.955 | 53.583 |

|   | F | (1) | (2) | (3) | (4) | R (mm) |
| --- | --- | --- | --- | --- | --- | --- |
| 1 | 16.400 | .000 | .000 | .008 | .788 | 500.00 |
| 2 | 24.000 | .000 | .000 | 2.367 | 2.158 | 500.00 |
| 3 | 27.300 | .000 | .000 | 3.607 | 2.405 | 500.00 |

In Table 8, r represents a radius of curvature of each lens surface (mm), d an interplanar gap between lenses (mm), n and v an index of refraction and an Abbe's number of each lens. Accompanying numerals to the characters represent the order counted from the object side end. The middle portion of Table 8 shows values of coefficients defining the shape of an aspherical surface formed on the lens surface $r_1$ on the object side in the first lens group G1. Further, there are described in order from the left, values of the conical constant k, and the aspherical coefficients of second order, fourth order, sixth order, eighth order and tenth order, $A_2$, $A_4$, $A_6$, $A_8$ and $A_{10}$. $E_{-n}$ means $10^{-n}$ in the values of aspherical coefficients.

The lower portion in Table 8 shows gaps between lens groups and lens advance amounts for focusing, for each shooting distance of infinity and 500.0 mm at three zooming positions (F=16.4, 24.0, and 27.3 mm) between the wide-angle end and telephoto end. The lens advance amount for focusing is different between focusing lens groups, and the ratio of moving distances is also different between the zooming positions, as in Embodiment 1.

Figure 5B:
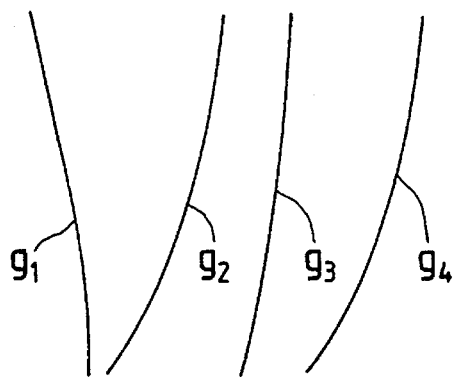
FIG. 5B is a drawing to show movement traces of lens groups in zooming.

FIG. 5B shows movement traces ($g_1$, $g_2$, $g_3$, $g_4$) of the lens groups during zooming with a variable of rotation angle a of rotating lens barrel.

Table 9 shows numerical values defining the movement traces.

TABLE 9

| ANGLE | (1) | (2) | (3) | (4) | F |
| --- | --- | --- | --- | --- | --- |
| .000 | .000 | .000 | .000 | .000 | 16.400 |
| 1.000 | −.064 | .036 | .014 | .036 | 16.434 |
| 2.000 | −.152 | .086 | .034 | .086 | 16.481 |
| 3.000 | −.261 | .148 | .059 | .148 | 16.540 |
| 4.000 | −.388 | .221 | .089 | .221 | 16.609 |
| 5.000 | −.531 | .305 | .122 | .305 | 16.688 |
| 6.000 | −.687 | .399 | .159 | .399 | 16.777 |
| 7.000 | −.854 | .501 | .200 | .501 | 16.873 |
| 8.000 | −1.029 | .610 | .244 | .610 | 16.976 |
| 9.000 | −1.210 | .726 | .290 | .726 | 17.085 |
| 10.000 | −1.394 | .846 | .339 | .846 | 17.199 |
| 11.000 | −1.580 | .971 | .388 | .971 | 17.317 |
| 12.000 | −1.765 | 1.099 | .440 | 1.099 | 17.437 |
| 13.000 | −1.947 | 1.228 | .491 | 1.228 | 17.559 |
| 14.000 | −2.124 | 1.358 | .543 | 1.358 | 17.682 |
| 15.000 | −2.295 | 1.486 | .594 | 1.486 | 17.803 |
| 16.000 | −2.458 | 1.612 | .645 | 1.612 | 17.922 |
| 17.000 | −2.612 | 1.734 | .693 | 1.734 | 18.037 |
| 18.000 | −2.756 | 1.851 | .740 | 1.851 | 18.147 |

TABLE 9-continued

| ANGLE | (1) | (2) | (3) | (4) | F |
| --- | --- | --- | --- | --- | --- |
| 19.000 | −2.892 | 1.964 | .786 | 1.964 | 18.254 |
| 20.000 | −3.022 | 2.075 | .830 | 2.075 | 18.359 |
| 21.000 | −3.148 | 2.186 | .874 | 2.186 | 18.463 |
| 22.000 | −3.272 | 2.298 | .919 | 2.298 | 18.569 |
| 23.000 | −3.395 | 2.411 | .964 | 2.411 | 18.676 |
| 24.000 | −3.519 | 2.529 | 1.012 | 2.529 | 18.787 |
| 25.000 | −3.645 | 2.652 | 1.061 | 2.652 | 18.903 |
| 26.000 | −3.774 | 2.782 | 1.113 | 2.782 | 19.026 |
| 27.000 | −3.908 | 2.920 | 1.168 | 2.920 | 19.157 |
| 28.000 | −4.046 | 3.069 | 1.228 | 3.069 | 19.297 |
| 29.000 | −4.190 | 3.229 | 1.292 | 3.229 | 19.448 |
| 30.000 | −4.340 | 3.402 | 1.361 | 3.402 | 19.612 |
| 31.000 | −4.494 | 3.590 | 1.436 | 3.590 | 19.790 |
| 32.000 | −4.654 | 3.794 | 1.518 | 3.794 | 19.983 |
| 33.000 | −4.817 | 4.015 | 1.606 | 4.015 | 20.191 |
| 34.000 | −4.982 | 4.250 | 1.700 | 4.250 | 20.414 |
| 35.000 | −5.143 | 4.498 | 1.799 | 4.498 | 20.649 |
| 36.000 | −5.299 | 4.755 | 1.902 | 4.755 | 20.892 |
| 37.000 | −5.447 | 5.019 | 2.007 | 5.019 | 21.143 |
| 38.000 | −5.586 | 5.287 | 2.115 | 5.287 | 21.397 |
| 39.000 | −5.714 | 5.558 | 2.223 | 5.558 | 21.655 |
| 40.000 | −5.831 | 5.829 | 2.332 | 5.829 | 21.913 |
| 41.000 | −5.936 | 6.100 | 2.440 | 6.100 | 22.171 |
| 42.000 | −6.031 | 6.369 | 2.547 | 6.369 | 22.428 |
| 43.000 | −6.115 | 6.637 | 2.655 | 6.637 | 22.684 |
| 44.000 | −6.189 | 6.905 | 2.762 | 6.905 | 22.941 |
| 45.000 | −6.255 | 7.178 | 2.871 | 7.178 | 23.202 |
| 46.000 | −6.313 | 7.457 | 2.983 | 7.457 | 23.470 |
| 47.000 | −6.363 | 7.750 | 3.100 | 7.750 | 23.751 |
| 48.000 | −6.406 | 8.062 | 3.225 | 8.062 | 24.052 |
| 49.000 | −6.440 | 8.404 | 3.362 | 8.404 | 24.382 |
| 50.000 | −6.463 | 8.782 | 3.513 | 8.782 | 24.747 |
| 51.000 | −6.471 | 9.202 | 3.681 | 9.202 | 25.155 |
| 52.000 | −6.459 | 9.669 | 3.868 | 9.669 | 25.610 |
| 53.000 | −6.422 | 10.189 | 4.076 | 10.189 | 26.118 |
| 54.000 | −6.353 | 10.763 | 4.305 | 10.763 | 26.682 |
| 55.000 | −6.247 | 11.389 | 4.556 | 11.389 | 27.300 |

In Table 9, the left end column shows rotation angles θ (ANGLE) of the rotating barrel, the right end column focal lengths (F), and four columns between the two end columns movement amounts of the lens groups along the optical axis. As shown in the table, the rotation angle θ for zooming from the wideangle end to the telephoto end is set to 55° in the present embodiment, as in Embodiment 1.

Figure 5C:
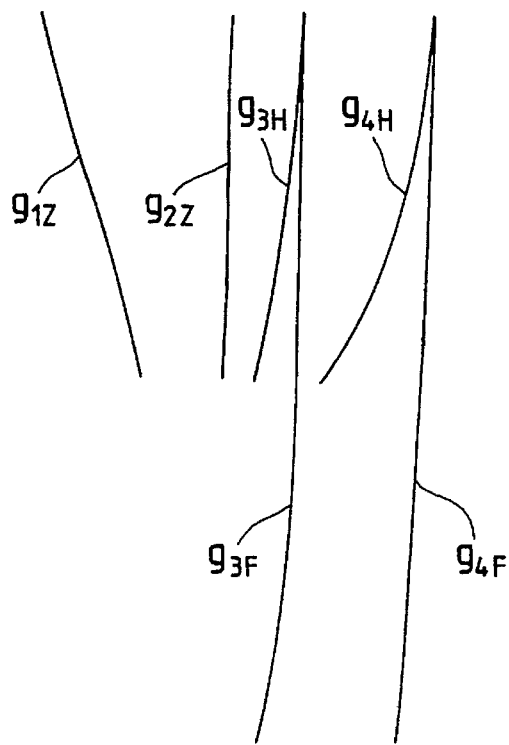
FIG. 5C is a drawing to show shapes of focus cams, zoom cams and compensating zoom cams to define zooming and focusing.

FIG. 5C shows cam shapes actually formed on the rotating barrel in the zoom lens according to the present invention. In FIG. 5C, $g_{3F}$ and $g_{4F}$ denote focus cams for the third lens group and for the fourth lens group, respectively, which are the focusing lens groups, and $g_{1Z}$ and $g_{2Z}$ the zoom cams for the first lens group and for the second lens group, respectively.

Further, $g_{3H}$ represents a compensating zoom cam common to the first and third lens groups, and $g_{4H}$ a compensating zoom cam common to the second and fourth lens groups.

In actual zooming, the movement traces $g_3$, $g_4$ of third and fourth lens groups, which are the focusing lens groups, are formed by combinations of the focus cams $g_{3F}$, $g_{4F}$ with the compensating zoom cams $g_{3H}$, $g_{4H}$, respectively.

Also, the movement trace $g_1$ of first lens group taking no part in focusing is formed by a combination of the zoom cam $g_{1Z}$ of first lens group with the compensating zoom cam $g_{3H}$, and the movement trace $g_2$ of second lens group is formed by a combination of the zoom cam $g_{2Z}$ of second lens group with the compensating zoom cam $g_{4H}$.

Table 10 shows numerical values defining the cam traces of the focus cams $g_{3F}$, $g_{4F}$.

TABLE 10

| ANGLE | (3) | (4) | F | ANGLE | (3) | (4) | F |
|---|---|---|---|---|---|---|---|
| .000 | .000 | .000 | 16.400 | | | | |
| 1.000 | .001 | .015 | 16.434 | 56.000 | .021 | .811 | .000 |
| 2.000 | .003 | .030 | 16.481 | 57.000 | .038 | .837 | .000 |
| 3.000 | .004 | .045 | 16.540 | 58.000 | .059 | .865 | .000 |
| 4.000 | .006 | .060 | 16.609 | 59.000 | .084 | .896 | .000 |
| 5.000 | .007 | .075 | 16.688 | 60.000 | .113 | .929 | .000 |
| 6.000 | .009 | .090 | 16.777 | 61.000 | .145 | .965 | .000 |
| 7.000 | .010 | .105 | 16.873 | 62.000 | .180 | 1.001 | .000 |
| 8.000 | .012 | .119 | 16.976 | 63.000 | .217 | 1.040 | .000 |
| 9.000 | .013 | .134 | 17.085 | 64.000 | .256 | 1.079 | .000 |
| 10.000 | .014 | .149 | 17.199 | 65.000 | .297 | 1.120 | .000 |
| 11.000 | .016 | .164 | 17.317 | 66.000 | .340 | 1.161 | .000 |
| 12.000 | .017 | .179 | 17.437 | 67.000 | .383 | 1.203 | .000 |
| 13.000 | .018 | .194 | 17.559 | 68.000 | .428 | 1.245 | .000 |
| 14.000 | .019 | .209 | 17.682 | 69.000 | .473 | 1.287 | .000 |
| 15.000 | .020 | .224 | 17.803 | 70.000 | .518 | 1.328 | .000 |
| 16.000 | .022 | .238 | 17.922 | 71.000 | .563 | 1.369 | .000 |
| 17.000 | .023 | .253 | 18.037 | 72.000 | .607 | 1.409 | .000 |
| 18.000 | .024 | .268 | 18.147 | 73.000 | .650 | 1.449 | .000 |
| 19.000 | .025 | .283 | 18.254 | 74.000 | .693 | 1.487 | .000 |
| 20.000 | .025 | .297 | 18.359 | 75.000 | 735 | 1.525 | .000 |
| 21.000 | .026 | .312 | 18.463 | 76.000 | .777 | 1.562 | .000 |
| 22.000 | .027 | .327 | 18.569 | 77.000 | .819 | 1.600 | .000 |
| 23.000 | .028 | .341 | 18.676 | 78.000 | .860 | 1.637 | .000 |
| 24.000 | .028 | .356 | 18.787 | 79.000 | .902 | 1.675 | .000 |
| 25.000 | .029 | .370 | 18.903 | 80.000 | .943 | 1.712 | .000 |
| 26.000 | .029 | .385 | 19.026 | 81.000 | .986 | 1.751 | .000 |
| 27.000 | .030 | .399 | 19.157 | 82.000 | 1.028 | 1.790 | .000 |
| 28.000 | .030 | .414 | 19.297 | 83.000 | 1.072 | 1.831 | .000 |
| 29.000 | .030 | .428 | 19.448 | 84.000 | 1.116 | 1.872 | .000 |
| 30.000 | .030 | .442 | 19.612 | 85.000 | 1.161 | 1.915 | .000 |
| 31.000 | .030 | .455 | 19.790 | 86.000 | 1.207 | 1.960 | .000 |
| 32.000 | .030 | .471 | 19.983 | 87.000 | 1.254 | 2.006 | .000 |
| 33.000 | .029 | .485 | 20.191 | 88.000 | 1.303 | 2.054 | .000 |
| 34.000 | .029 | .499 | 20.414 | 89.000 | 1.353 | 2.105 | .000 |
| 35.000 | .028 | .513 | 20.649 | 90.000 | 1.405 | 2.156 | .000 |
| 36.000 | .028 | .527 | 20.892 | 91.000 | 1.458 | 2.209 | .000 |
| 37.000 | .027 | .541 | 21.143 | 92.000 | 1.514 | 2.263 | .000 |
| 38.000 | .026 | .555 | 21.397 | 93.000 | 1.571 | 2.318 | .000 |
| 39.000 | .025 | .569 | 21.655 | 94.000 | 1.630 | 2.373 | .000 |
| 40.000 | .024 | .583 | 21.913 | 95.000 | 1.691 | 2.428 | .000 |
| 41.000 | .024 | .597 | 22.171 | 96.000 | 1.754 | 2.483 | .000 |
| 42.000 | .023 | .611 | 22.428 | 97.000 | 1.821 | 2.537 | .000 |
| 43.000 | .021 | .624 | 22.684 | 98.000 | 1.893 | 2.592 | .000 |
| 44.000 | .020 | .638 | 22.941 | 99.000 | 1.972 | 2.645 | .000 |
| 45.000 | .018 | .652 | 23.202 | 100.000 | 2.060 | 2.699 | .000 |
| 46.000 | .016 | .665 | 23.470 | 101.000 | 2.159 | 2.751 | .000 |
| 47.000 | .013 | .677 | 23.751 | 102.000 | 2.272 | 2.803 | .000 |
| 48.000 | .009 | .689 | 24.052 | 103.000 | 2.399 | 2.854 | .000 |
| 49.000 | .005 | .701 | 24.382 | 104.000 | 2.542 | 2.904 | .000 |
| 50.000 | .000 | .712 | 24.747 | 105.000 | 2.699 | 2.953 | .000 |
| 51.000 | -.003 | .724 | 25.155 | 106.000 | 2.868 | 3.002 | .000 |
| 52.000 | -.005 | .737 | 25.610 | 107.000 | 3.047 | 3.050 | .000 |
| 53.000 | -.004 | .752 | 26.118 | 108.000 | 3.232 | 3.098 | .000 |
| 54.000 | .000 | .769 | 26.682 | 109.000 | 3.422 | 3.146 | .000 |
| 55.000 | .008 | .788 | 27.300 | 110.000 | 3.615 | 3.193 | .000 |

In Table 10, the left end column and the fifth column show rotation angles θ (ANGLE) of the rotating barrel, the second and third columns and the sixth and seventh columns movement amounts of the third and fourth lens groups along the optical axis, and the fourth and eighth columns corresponding focal lengths (F). In the table, the rotation angle θ of the rotating barrel of the focus cams $g_{3F}$, $g_{4F}$ is set to 110°, which is a double of the rotation angle 55° for zooming, as in Embodiment 1.

Table 11 shows numerical values defining the cam traces of the zoom cams $g_{1Z}$, $g_{2Z}$ for the first lens group G1 and for the second lens group G2. In Table 11, the left end column shows rotation angles θ (ANGLE) of the rotating barrel, the second and third columns movement amounts of the first and second lens groups, respectively, along the optical axis, and the right end column corresponding focal lengths (F). The rotation angle θ for zooming from the wideangle end to the telephoto end is set to 55° identical to that in Table 9.

TABLE 1

| ANGLE | (1) | (2) | F |
|---|---|---|---|
| .000 | .000 | .000 | 16.400 |
| 1.000 | -.077 | .015 | 16.434 |
| 2.000 | -.184 | .030 | 16.481 |
| 3.000 | -.316 | .045 | 16.540 |
| 4.000 | -.471 | .060 | 16.609 |
| 5.000 | -.646 | .075 | 16.688 |
| 6.000 | -.838 | .090 | 16.777 |
| 7.000 | -1.044 | .105 | 16.873 |
| 8.000 | -1.262 | .119 | 16.976 |
| 9.000 | -1.487 | .134 | 17.085 |
| 10.000 | -1.719 | .149 | 17.199 |
| 11.000 | -1.953 | .164 | 17.317 |
| 12.000 | -2.187 | .179 | 17.437 |
| 13.000 | -2.420 | .194 | 17.559 |
| 14.000 | -2.648 | .209 | 17.682 |
| 15.000 | -2.869 | .224 | 17.803 |
| 16.000 | -3.081 | .238 | 17.922 |
| 17.000 | -3.283 | .253 | 18.037 |
| 18.000 | -3.472 | .268 | 18.147 |
| 19.000 | -3.653 | .283 | 18.254 |
| 20.000 | -3.826 | .297 | 18.359 |
| 21.000 | -3.996 | .312 | 18.463 |
| 22.000 | -4.164 | .327 | 18.569 |
| 23.000 | -4.332 | .341 | 18.676 |
| 24.000 | -4.502 | .356 | 18.787 |
| 25.000 | -4.677 | .370 | 18.903 |
| 26.000 | -4.858 | .385 | 19.026 |
| 27.000 | -5.046 | .399 | 19.157 |
| 28.000 | -5.244 | .414 | 19.297 |
| 29.000 | -5.452 | .428 | 19.448 |
| 30.000 | -5.671 | .442 | 19.612 |
| 31.000 | -5.901 | .456 | 19.790 |
| 32.000 | -6.142 | .471 | 19.983 |
| 33.000 | -6.394 | .485 | 20.191 |
| 34.000 | -6.653 | .499 | 20.414 |
| 35.000 | -6.914 | .513 | 20.649 |
| 36.000 | -7.173 | .527 | 20.892 |
| 37.000 | -7.427 | .541 | 21.143 |
| 38.000 | -7.674 | .555 | 21.397 |
| 39.000 | -7.911 | .569 | 21.655 |
| 40.000 | -8.138 | .583 | 21.913 |
| 41.000 | -8.352 | .597 | 22.171 |
| 42.000 | -8.556 | .611 | 22.428 |
| 43.000 | -8.748 | .624 | 22.684 |
| 44.000 | -8.931 | .638 | 22.941 |
| 45.000 | -9.108 | .652 | 23.202 |
| 46.000 | -9.280 | .665 | 23.470 |
| 47.000 | -9.451 | .677 | 23.751 |
| 48.000 | -9.622 | .689 | 24.052 |
| 49.000 | -9.797 | .701 | 24.382 |
| 50.000 | -9.975 | .712 | 24.747 |
| 51.000 | -10.155 | .724 | 25.155 |
| 52.000 | -10.332 | .737 | 25.610 |
| 53.000 | -10.502 | .752 | 26.118 |
| 54.000 | -10.659 | .769 | 26.682 |
| 55.000 | -10.795 | .788 | 27.300 |

Table 12 shows numerical values defining the cam trace of the compensating zoom cam $g_{3H}$ common to the first and third lens groups and the cam trace of the compensating zoom cam $g_{4H}$ common to the second and fourth lens groups. In Table 12, the left end column shows rotation angles θ (ANGLE) of the rotating barrel, the second and third columns movement amounts of the first and third lens groups along the optical axis and of the second and fourth lens groups along the optical axis, respectively, and the right end column corresponding focal lengths (F).

TABLE 12

| ANGLE | (3) | (4) | F |
|---|---|---|---|
| .000 | .000 | .000 | 16.400 |
| 1.000 | .013 | .021 | 16.434 |
| 2.000 | .031 | .056 | 16.481 |
| 3.000 | .055 | .103 | 16.540 |
| 4.000 | .083 | .161 | 16.609 |
| s.000 | .115 | .231 | 16.688 |
| 6.000 | .151 | .309 | 16.777 |
| 7.000 | .190 | .396 | 16.873 |
| 8.000 | .232 | .490 | 16.976 |
| 9.000 | .277 | .591 | 17.085 |
| 10.000 | .324 | .697 | 17.199 |
| 11.000 | .373 | .807 | 17.317 |
| 12.000 | .423 | .920 | 17.437 |
| 13.000 | .473 | 1.034 | 17.559 |
| 14.000 | .524 | 1.149 | 17.682 |
| 15.000 | .574 | 1.262 | 17.803 |
| 16.000 | .623 | 1.374 | 17.922 |
| 17.000 | .671 | 1.481 | 18.037 |
| 18.000 | .717 | 1.583 | 18.147 |
| 19.000 | .761 | 1.682 | 18.254 |
| 20.000 | .805 | 1.778 | 18.359 |
| 21.000 | .848 | 1.874 | 18.463 |
| 22.000 | .892 | 1.971 | 18.569 |
| 23.000 | .937 | 2.070 | 18.676 |
| 24.000 | .983 | 2.173 | 18.787 |
| 25.000 | 1.032 | 2.282 | 18.903 |
| 26.000 | 1.083 | 2.397 | 19.026 |
| 27.000 | 1.139 | 2.521 | 19.157 |
| 28.000 | 1.198 | 2.655 | 19.297 |
| 29.000 | 1.262 | 2.801 | 19.448 |
| 30.000 | 1.331 | 2.960 | 19.612 |
| 31.000 | 1.406 | 3.134 | 19.790 |
| 32.000 | 1.488 | 3.324 | 19.983 |
| 33.000 | 1.571 | 3.530 | 20.191 |
| 34.000 | 1.671 | 3.752 | 20.414 |
| 35.000 | 1.771 | 3.985 | 20.649 |
| 36.000 | 1.874 | 4.228 | 20.892 |
| 37.000 | 1.981 | 4.478 | 21.143 |
| 38.000 | 2.089 | 4.732 | 21.397 |
| 39.000 | 2.198 | 4.989 | 21.655 |
| 40.000 | 2.307 | 5.246 | 21.913 |
| 41.000 | 2.416 | 5.503 | 22.171 |
| 42.000 | 2.525 | 5.758 | 22.428 |
| 43.000 | 2.633 | 6.012 | 22.684 |
| 44.000 | 2.742 | 6.267 | 22.941 |
| 45.000 | 2.853 | 6.526 | 23.202 |
| 46.000 | 2.967 | 6.793 | 23.470 |
| 47.000 | 3.087 | 7.073 | 23.751 |
| 48.000 | 3.216 | 7.373 | 24.052 |
| 49.000 | 3.357 | 7.704 | 24.382 |
| 50.000 | 3.512 | 8.070 | 24.747 |
| 51.000 | 3.684 | 8.478 | 25.155 |
| 52.000 | 3.873 | 8.932 | 25.610 |
| 53.000 | 4.080 | 9.437 | 26.118 |
| 54.000 | 4.305 | 9.994 | 26.682 |
| 55.000 | 4.548 | 10.601 | 27.300 |

Also in Embodiment 2, in zooming, the movement traces $g_3$, $g_4$ of the third and fourth lens groups, which are the focusing lens groups, are formed by combinations of the focus cams $g_{3F}$, $g_{4F}$ with the compensating zoom cams $g_{3H}$, $g_{4F}$, respectively, and the movement traces $g_1$, $g_2$ of the first and second lens groups taking no part in focusing are formed by combinations of the zoom cams $g_{1Z}$, $g_{2Z}$ for the first and second lens groups with the compensating zoom cams $g_{3H}$, $g_{4H}$, respectively. Therefore, if the movement amounts along the optical axis in Table 10 and Table 11 are added to the movement amounts along the optical axis in Table 12 in correspondence with each other, the sums should correspond to the movement amounts along the optical axis in Table 9.

In focusing, the third lens group and the fourth lens group, which are focusing lens groups, move by the same rotation angle on the focus cams $g_{3F}$, $g_{4F}$ thereby to achieve focusing. Table 13 shows rotation angles of rotating barrel for focusing with shooting distance R=0.5, 0.8, 1.2, 2.0, 3.0 m at respective zooming positions of focal length F=16.4, 18.0, 20.0. 22.0, 24.0, 27.3 mm in actual focusing with the focus cams of Table 10, actual advance amounts (DX) of the focusing lens groups in correspondence with the rotation angles, and displacement amounts (BF) of an image point with the advance amounts (DX) given.

TABLE 13

| | R | 500.00 | 800.00 | 1200.00 | 2000.00 | 3000.00 |
|---|---|---|---|---|---|---|
| F 16.400 | BF | .000 | −.090 | −.087 | −.065 | −.053 |
| F 18.000 | BF | .000 | .014 | −.023 | −.028 | −.029 |
| F 20.000 | BF | .000 | −.012 | .054 | .027 | .007 |
| F 22.000 | BF | .000 | .000 | .040 | .079 | .052 |
| F 24.000 | BF | .000 | .000 | .000 | .045 | .053 |
| F 27.300 | BF | .000 | .038 | .024 | .000 | .000 |
| ANGLE | DX | 55.000 | 37.257 | 25.580 | 15.769 | 11.087 |
| F 16.400 | DX | .000 | .000 | .008 | .788 | R 500.00 |
| F 18.000 | DX | .000 | .000 | .570 | 1.148 | R 500.00 |
| F 20.000 | DX | .000 | .000 | 1.229 | 1.538 | R 500.00 |
| F 22.000 | DX | .000 | .000 | 1.688 | 1.859 | R 500.00 |
| F 24.000 | DX | .000 | .000 | 2.367 | 2.158 | R 500.00 |
| F 27.300 | DX | .000 | .000 | 3.607 | 2.405 | R 500.00 |
| F 16.400 | DX | .000 | .000 | .027 | .544 | R 800.00 |
| F 18.000 | DX | .000 | .000 | −.023 | .519 | R 800.00 |
| F 20.000 | DX | .000 | .000 | .459 | .829 | R 800.00 |
| F 22.000 | DX | .000 | .000 | .819 | 1.034 | R 800.00 |
| F 24.000 | DX | .000 | .000 | 1.155 | 1.232 | R 800.00 |
| F 27.300 | DX | .000 | .000 | 1.520 | 1.489 | R 800.00 |
| F 16.400 | DX | .000 | .000 | .029 | .379 | R 1200.00 |
| F 18.000 | DX | .000 | .000 | .000 | .366 | R 1200.00 |
| F 20.000 | DX | .000 | .000 | .022 | .384 | R 1200.00 |
| F 22.000 | DX | .000 | .000 | .312 | .570 | R 1200.00 |
| F 24.000 | DX | .000 | .000 | .658 | .778 | R 1200.00 |
| F 27.300 | DX | .000 | .000 | .960 | .946 | R 1200.00 |
| F 16.400 | DX | .000 | .000 | .021 | .235 | R 2000.00 |
| F 18.000 | DX | .000 | .000 | .007 | .229 | R 2000.00 |
| F 20.000 | DX | .000 | .000 | −.020 | .215 | R 2000.00 |
| F 22.000 | DX | .000 | .000 | −.002 | .226 | R 2000.00 |
| F 24.000 | DX | .000 | .000 | .231 | .376 | R 2000.00 |
| F 27.300 | DX | .000 | .000 | .544 | .572 | R 2000.00 |
| F 16.400 | DX | .000 | .000 | .016 | .165 | R 3000.00 |
| F 18.000 | DX | .000 | .000 | .007 | .162 | R 3000.00 |
| F 20.000 | DX | .000 | .000 | −.008 | .155 | R 3000.00 |
| F 22.000 | DX | .000 | .000 | −.028 | .142 | R 3000.00 |
| F 24.000 | DX | .000 | .000 | .073 | .206 | R 3000.00 |
| F 27.300 | DX | .000 | .000 | .336 | .376 | R 3000.00 |

The upper section of Table 13 shows the displacement amounts (BF) of an image point for the shooting distances R at each zooming position, and the middle section the rotation angles of rotating barrel for the shooting distances R. Further, the lower section shows the actual advance amounts (DX) of the focusing lens groups in correspondence with the focusing rotation angles for each case of shooting distance R=0.5, 0.8, 1.2, 2.0, 3.0 m at each zooming position of focal length F=16.4, 18.0, 20.0, 22.0, 24.0, 27.3 mm. In the lower section, numerical values in the left end column represent overall focal lengths F, those in the right end column shooting distances R, and those between the two end columns actual advance amounts (DX) of the first lens group, the second lens group, the third lens group, and the fourth lens group in this order from the left. When a lens moves toward the object, the sign is positive for any value in Table 13.

It is seen from Table 13 that the displacement amount of the image point is small for any combination of focal length and shooting distance and is within the depth of focus at any zooming position and at any shooting distance. Namely, the manual focus is enabled in the floating-type rear focus zoom lens by the third lens group and the fourth lens group.

The present embodiment is excellent not only in performance in the entire zooming range in shooting at the infinite focus position, but also in imaging performance with less change in aberration in shooting at the closest focus position.

According to the present invention as described above, the inner focus or rear focus zoom lens of so-called floating-type is achieved by a simple structure with a plurality of lens groups moving in the lens system, which permits the so-called manual focus.

In more detail, the movement trace of each non-focusing lens group is formed by a combination of a compensating zoom cam for a focusing lens group with a corresponding zoom cam for the each non-focusing lens group in the present invention, so that the compensating zoom cam for the focusing lens group can be used in common for the non-focusing lens groups.

Accordingly, the focus cams for the focusing lens groups and the zoom cams for the non-focusing lens groups have the same function in zooming.

Since only the focus cams are used in focusing, the zoom lens may be simple in mechanical design, as described in the embodiment. For example, the construction may be such that a focus cam and a compensating zoom cam for an arbitrary focusing lens group and zoom cams for non-focusing lens groups are cut in a cam barrel and that compensating zoom cams and focus cams for the other focusing lens groups are cut in other barrels newly added. (As described above, the compensating zoom cams may be provided on the stationary barrel.)

As described above, the previously complex focusing method with a plurality of lens groups moving in the zoom lens can be carried out to with a simple structure in which further cam barrels are newly added to the basic structure of the stationary barrel and the cam barrel for the so-called front-focus-type zoom lens.

Further, if there is a fixed focusing lens group in zooming with respect to the image plane, the cam shape of the focus cam of the fixed focusing lens group is symmetric with that of the compensating zoom cam thereof with respect to the rotational direction of rotating barrel in the zooming range. In this case, however, the focusing lens group is fixed in respect of optical design but is constructed as a combination of movable elements in respect of mechanical design. Therefore, the focus lens group should be advantageously constructed more positively as a movable group rather than as the fixed focusing lens group to the image plane in zooming.

In case that there is a lens group fixed relative to the image plane in zooming and taking no part in focusing, the holding frame for holding the fixed lens group should be directly connected to the stationary barrel as to be free of the movement correction along the optical axis by the compensating zoom cam. It should be noted that the present invention is not limited to the focusing method in the zoom lens as described in the embodiments. Needless to say, the present invention can be applicable to zoom lenses of any zooming method with a plurality of lens groups independently moving for focusing, for example to the zoom lens with positive, negative, positive and positive four lens groups as described in Japanese Laid-open Patent Application No. 2-256011, in which the third and the fourth lens groups are focusing lens groups, or to the zoom lens with positive, negative, positive, negative and positive five lens groups, in which the third, the fourth and the fifth lens groups are focusing lens groups.

Embodiment 3

Figure 6A:
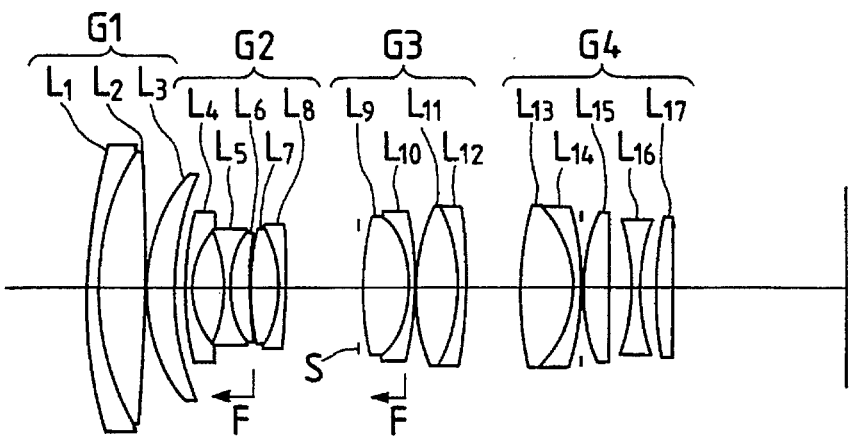
FIG. 6A is a diagram to show the lens structure of a zoom lens in Embodiment 3 according to the present invention.
Figure 6B:
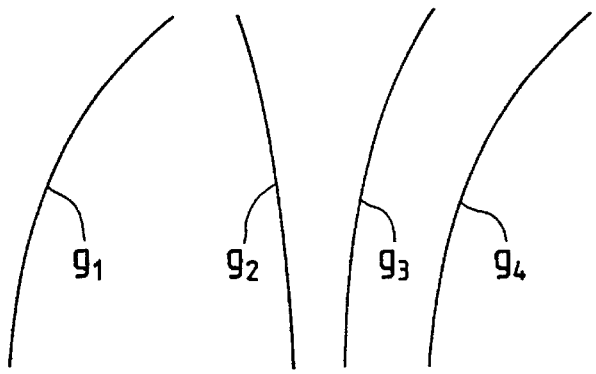
FIG. 6B is a drawing to show movement traces of lens groups in zooming.

Since a zoom lens in Embodiment 3 has the same structure as that of the zoom lens in Embodiment 1 as shown in FIG. 6A, the same elements and portions as those in Embodiment 1 are omitted to explain herein, and only portions different from those in Embodiment 1 will be described in the following.

Figure 6C:
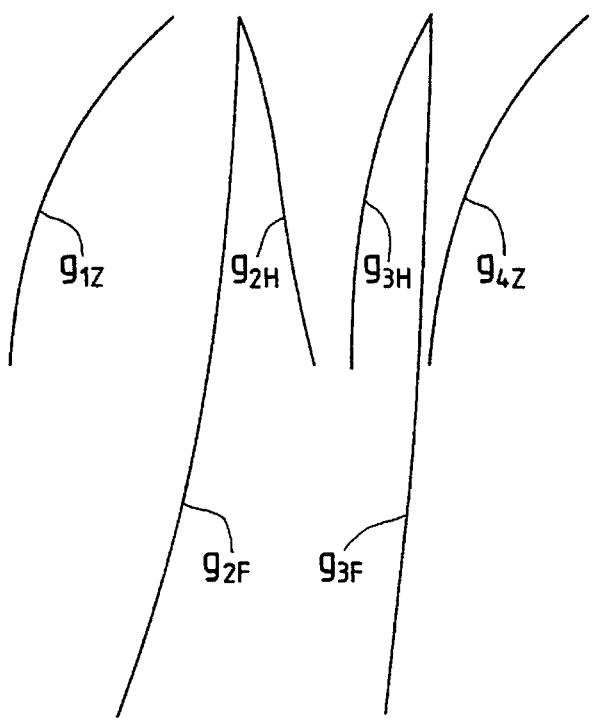
FIG. 6C is a drawing to show shapes of focus cams, zoom cams and compensating zoom cams to define zooming and focusing.

FIG. 6C shows cam shapes actually formed on the rotating barrel in the zoom lens according to the present invention. In FIG. 6C, $g_{2F}$ and $g_{3F}$ denote focus cams for the second lens group and for the third lens group, respectively, which are the focusing lens groups, and $g_{1Z}$ and $g_{4Z}$ the zoom cams for the first lens group and for the fourth lens group, respectively.

Further, $g_{2H}$ represents a compensating zoom cam for the second lens group and $g_{3H}$ a compensating zoom cam for the third lens group.

In actual zooming, the movement traces $g_2$, $g_3$ of second and third lens groups, which are the focusing lens groups, are formed by combinations of the focus cams $g_{2F}$, $g_{3F}$ with the compensating zoom cams $g_{2H}$, $g_{3H}$, respectively.

Also, the movement traces $g_1$, $g_4$ of first and fourth lens groups taking no part in focusing are formed by the zoom cams $g_{1Z}$, $g_{4Z}$ for the first lens group and for the fourth lens group as they are.

Table 14 shows numerical values defining the cam traces of the focus cams $g_{1Z}$, $g_{4Z}$ for the first lens group G1 and for the fourth lens group G4.

TABLE 14

| ANGLE | (1) | (4) | F |
|---|---|---|---|
| .000 | .000 | .000 | 35.989 |
| 1.000 | .773 | .773 | 37.601 |
| 2.000 | 1.521 | 1.521 | 39.238 |
| 3.000 | 2.240 | 2.240 | 40.890 |
| 4.000 | 2.931 | 2.931 | 42.548 |
| 5.000 | 3.593 | 3.592 | 44.203 |
| 6.000 | 4.225 | 4.224 | 45.847 |
| 7.000 | 4.827 | 4.827 | 47.472 |
| 8.000 | 5.402 | 5.402 | 49.072 |
| 9.000 | 5.948 | 5.948 | 50.641 |
| 10.000 | 6.468 | 6.468 | 52.180 |
| 11.000 | 6.966 | 6.966 | 53.700 |
| 12.000 | 7.445 | 7.445 | 55.210 |
| 13.000 | 7.907 | 7.907 | 56.721 |
| 14.000 | 8.355 | 8.355 | 58.240 |
| 15.000 | 8.791 | 8.791 | 59.777 |
| 16.000 | 9.215 | 9.215 | 61.335 |
| 17.000 | 9.626 | 9.626 | 62.906 |
| 18.000 | 10.024 | 10.024 | 64.475 |
| 19.000 | 10.406 | 10.406 | 66.031 |
| 20.000 | 10.773 | 10.773 | 67.561 |
| 21.000 | 11.123 | 11.123 | 69.053 |
| 22.000 | 11.455 | 11.455 | 70.498 |
| 23.000 | 11.769 | 11.769 | 71.888 |
| 24.000 | 12.063 | 12.063 | 73.223 |
| 25.000 | 12.336 | 12.336 | 74.507 |
| 26.000 | 12.589 | 12.589 | 75.740 |
| 27.000 | 12.823 | 12.823 | 76.928 |
| 28.000 | 13.038 | 13.038 | 78.075 |
| 29.000 | 13.238 | 13.238 | 79.186 |
| 30.000 | 13.424 | 13.424 | 80.266 |
| 31.000 | 13.597 | 13.597 | 81.318 |
| 32.000 | 13.759 | 13.759 | 82.349 |
| 33.000 | 13.911 | 13.911 | 83.362 |
| 34.000 | 14.055 | 14.055 | 84.360 |
| 35.000 | 14.191 | 14.191 | 85.349 |
| 36.000 | 14.320 | 14.320 | 86.331 |
| 37.000 | 14.444 | 14.444 | 87.305 |
| 38.000 | 14.563 | 14.563 | 88.270 |
| 39.000 | 14.677 | 14.677 | 89.226 |
| 40.000 | 14.786 | 14.786 | 90.169 |
| 41.000 | 14.890 | 14.890 | 91.100 |
| 42.000 | 14.990 | 14.990 | 92.016 |
| 43.000 | 15.086 | 15.086 | 92.917 |
| 44.000 | 15.179 | 15.179 | 93.801 |

TABLE 14-continued

| ANGLE | (1) | (4) | F |
|---|---|---|---|
| 45.000 | 15.267 | 15.267 | 94.666 |
| 46.000 | 15.352 | 15.352 | 95.512 |
| 47.000 | 15.433 | 15.433 | 96.336 |
| 48.000 | 15.510 | 15.510 | 97.138 |
| 49.000 | 15.584 | 15.584 | 97.915 |
| 50.000 | 15.655 | 15.655 | 98.668 |
| 51.000 | 15.722 | 15.722 | 99.393 |
| 52.000 | 15.786 | 15.786 | 100.091 |
| 53.000 | 15.846 | 15.846 | 100.759 |
| 54.000 | 15.903 | 15.903 | 101.395 |
| 55.000 | 15.956 | 15.956 | 102.000 |

In Table 14, the left end column shows rotation angles θ (ANGLE) of the rotating barrel, the second and third columns movement amounts of the first and fourth lens groups along the optical axis, and the right end column corresponding focal lengths (F). Since the movement traces $g_1$, $g_4$ of the first lens group and the fourth lens group taking no part in focusing are coincident with the zoom cams $g_{1Z}$, $g_{4Z}$ for the first and fourth lens groups, respectively, the movement amounts along the optical axis in Table 14 should be coincident with those along the optical axis in Table 2 in Embodiment 1. However, since the first lens group G1 and the fourth lens group G4 move together in the present embodiment, the cam traces thereof take the same numerical values herein.

Numerical values defining the cam shapes of the compensating zoom cam $g_{2H}$ for the second lens group and of the compensating zoom cam $g_{3H}$ for the third lens group are the same as those in Table 5 in Embodiment 1. In Table 5, the left end column shows rotation angles θ (ANGLE) of the rotating barrel, the second and third columns movement amounts of the second and third lens groups, respectively, along the optical axis, and the right end column corresponding focal lengths (F).

In the present embodiment, in zooming, the movement traces $g_2$, $g_3$ of the second and third lens groups, which are the focusing lens groups, are formed by combinations of the focus cams $g_{2F}$, $g_{3F}$ with the compensating zoom cams $g_{2H}$, $g_{3H}$, respectively, and therefore the sums of the axial movement amounts in Table 3 and the corresponding axial movement amounts in Table 5 should correspond to the axial movement amounts in Table 2.

The present embodiment is excellent not only in performance in the entire zooming range in shooting at the infinite focus position, but also in imaging performance with less change in aberration in shooting at the closest focus position.

Figure 7A:
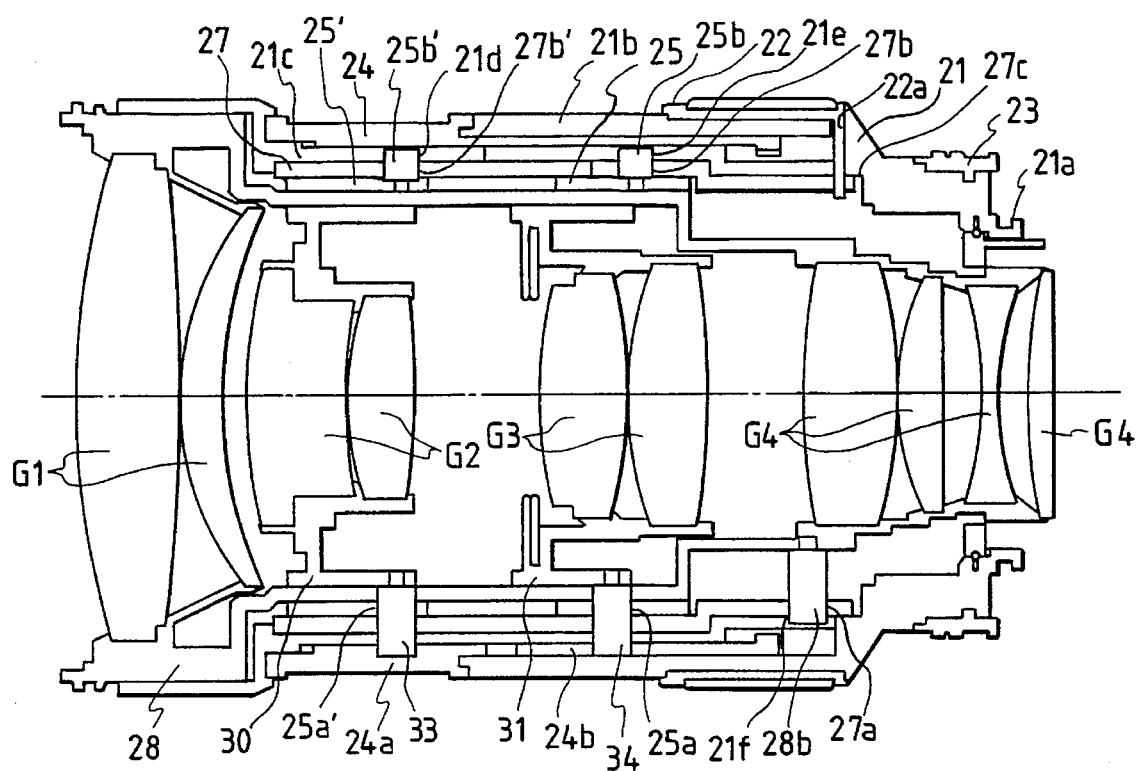
FIG. 7A is a vertical cross section of another embodiment of zoom lens barrel according to the present invention.
Figure 7B:
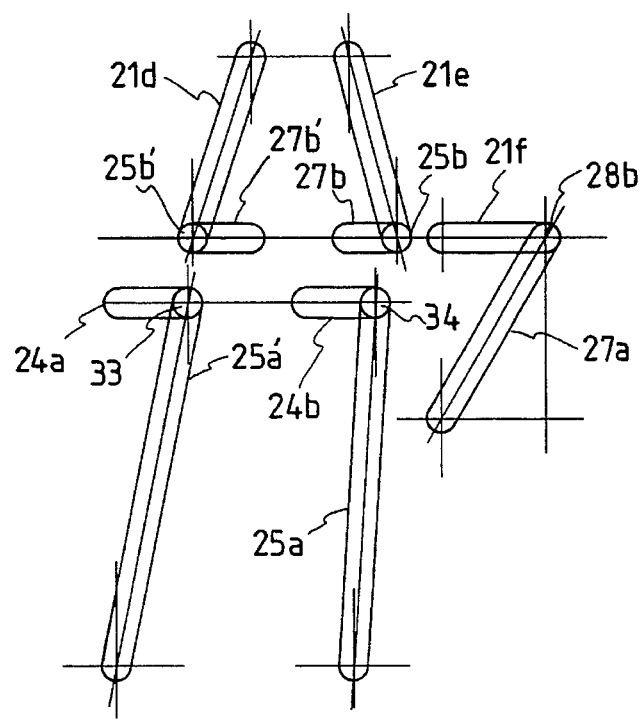
FIG. 7B is an expanded view to show cam grooves and guide grooves in the zoom lens barrel as shown in FIG. 7A.

Next described with reference to FIG. 7A is the structure of zoom lens barrel corresponding to the optical system in Embodiment 3.

Reference numeral 21 designates a stationary barrel, which is integrally provided with a mount portion 21a, through which the zoom lens is mounted onto a camera body (not shown), at the end portion on the camera body side. A zoom ring 22 and a stop ring 23 are fit on the outer peripheral portion of a large diameter portion 21b of the stationary barrel 21 as being rotatable in a certain angle range. Also, a distance ring 24 is fit on the outer peripheral portion of a small diameter portion 21c of the stationary barrel 21 as being rotatable in a certain angle range.

A cam ring 27 is fit on the inner peripheral portion of the small diameter portion 21c of the stationary barrel 21 as being fixed in the direction of optical axis but rotatable in a certain angle range about the optical axis. A cam ring 25 and a cam ring 25' are fit on the inner peripheral portion of the cam ring 27 as being rotatable in a certain angle range and movable along the optical axis in a certain distance range. Provided in the cam ring 27 is a zoom cam groove 27a for moving, in zooming, a first lens group holding frame 28 holding the first lens group and the fourth lens group. Provided in the cam ring 25 is a cam groove 25a, which is the focus cam for the third lens group G3 as described above. Further, provided in the cam ring 25' is a cam groove 25a', which is the focus cam for the second lens group G2. A cam pin 34 planted in the outer peripheral surface of a third lens group holding frame 31 is fit in the cam groove 25a, while a cam pin 33 planted in the outer peripheral surface of a second lens group holding frame 30 is fit in the cam groove 25a'. A cam pin 25b is planted in the cam ring 25 to extend radially outward, penetrates through a guide groove 27b parallel with the optical axis in the cam ring 27, and is fit into a compensating zoom cam groove 21e formed in the small diameter portion 21c of the stationary barrel 21. A cam pin 25b' is planted in the cam ring 25' to extend radially outward, penetrates through a guide groove 27b' parallel to the optical axis in the cam ring 27, and is fit into a compensating zoom cam groove 21d formed in the small diameter portion 21c of the stationary barrel 21. A groove 27c is provided at the right end of the cam ring 27 to engage with a lever portion 22a extending radially inward of the zoom lens 22. Accordingly, the zoom ring 22 and the cam ring 27 rotate together in the rotational direction, and further, the cam ring 27 and the cam rings 25, 25' also rotate together in the rotational direction through the guide grooves 27b, 27b'.

The first lens group holding frame 28 holding the first lens group G1 and the fourth lens group G4 is fit on the inner peripheral portions of the cam ring 25 and the cam ring 25'. A cam pin 28b is planted in the outer peripheral portion of the first lens group holding frame 28 to penetrate through the cam groove 27a in the cam ring 27 and the tip end portion thereof is fit in a guide groove 21f provided in the small diameter portion 21c of the stationary barrel 21, so that the first lens group holding frame 28 can linearly move along the optical axis in a certain distance range.

A second lens group holding frame 30 and a third lens group holding frame 31 are fit on the inner peripheral portion of the first lens group holding frame 28. The cam pin 33, is planted in the outer peripheral portion of the second lens group holding frame 30, penetrates through the first lens group holding frame 28, is fit in the cam groove 25a', which is the focus cam for the second lens group G2, provided in the cam ring 25', further penetrates through a clearance groove in the cam ring 27 and a clearance groove provided in the small diameter portion 21c of the stationary barrel 21, and is fit in a guide groove 24a provided in the inner cylindrical portion of the distance ring 24 in parallel with the optical axis. Similarly, the cam pin 34 is planted in the outer peripheral portion of the third lens group holding frame 31, penetrates through the first lens group holding frame 28, is fit in a cam groove 25a, which is the focus cam for the third lens group G3, provided in the cam ring 25, further penetrates through a clearance groove in the cam ring 27 and a clearance groove provided in the small diameter portion 21c of the stationary barrel 21, and is fit in a guide groove 24b provided in the inner cylindrical portion of the distance ring 24 in parallel with the optical axis.

Description of the Operation of Lens Barrel

Next described is the operation of the lens barrel having the structure as described above.

The zooming operation is first described.

When the zoom ring 22 is rotated, the cam ring 27 is also rotated through the lever portion 22a and the groove 27c.

With rotation of the cam ring 27, the cam rings 25, 25' rotate the same angle through the guide grooves 27b, 27b'. With the rotation, the cam ring 25 moves along the optical axis while rotating, following the compensating zoom cam groove 21e provided in the small diameter portion of the stationary barrel 21. Since the cam ring 25' is incorporated with the cam ring 27 in the rotational direction, the cam ring 25' also rotates at the same time. The cam ring 25' moves along the optical axis while rotating, following the second compensating zoom cam groove 21d provided in the small diameter portion 21c of the stationary barrel 21. As the cam ring 27 rotates, the first lens group holding frame 28 linearly moves along the optical axis while guided by the guide groove 21f in the stationary barrel 21, with the cam pin 28b planted in the outer peripheral portion following the zoom cam of cam groove 27a provided in the cam ring 27. As the cam ring 25 moves while rotating, the third lens group holding frame 31 also linearly moves along the optical axis while guided by the guide groove 24b provided in the inner cylindrical portion of the stationary distance ring 24 in parallel with the optical axis, with the cam pin 34 following the focus cam of cam groove 25a provided in the cam ring 25. Similarly, the second lens group holding frame 30 also linearly moves along the optical axis while guided by the guide groove 24a provided in the inner cylindrical portion of the stationary distance ring 24 in parallel with the optical axis, with the cam pin 23 following the focus cam of cam groove 25a' provided in the cam ring 25'.

A movement amount of the first lens group holding frame 28 along the optical axis is determined only by the zoom cam of cam groove 27a in the cam ring 27. A movement amount of the third lens group holding frame 31 is a sum of the focus cam of cam groove 25a in the cam ring 25 with the compensating zoom cam of cam groove 21e provided in the stationary barrel 21. A movement amount of the second lens group holding frame 30 is a sum of the focus cam of cam groove 25a' in the cam ring 25' with the compensating zoom cam of cam groove 21d provided in the stationary barrel 21.

The focusing operation is next described.

With rotation of the distance ring 24, the third lens group holding frame 31 and the second lens group holding frame 30 move along the optical axis while rotating, following the focus cams of cam groove 25a and cam groove 25a', respectively, since the cam pin 33 planted in the second lens group holding frame 30 is fit in the guide groove 24a parallel to the optical axis in the inner cylindrical portion, the cam pin 34 planted in the outer peripheral portion of the third lens group holding frame 31 is fit in the guide groove 24b, and the cam pins 33, 34 are fit in the cam grooves 25a', 25a in the stationary cam rings 25', 25, respectively.

The above operation achieves the movement traces in focusing the second lens group and the third lens group as shown in the drawings.

Although the present embodiment is so arranged that the compensating zoom cams for the second lens group and for the third lens group, which are the focusing lens groups, are formed in the stationary barrel 21 and such that the focus cams thereof are formed on the cam ring 25' and the cam ring 25, another arrangement may be such that both the compensating zoom cam and the focus cam for the second lens group are formed in the cam ring 25' and that both the compensating zoom cam and the focus cam for the third lens group are formed in the cam ring 25.

Embodiment 4

Figure 8A:
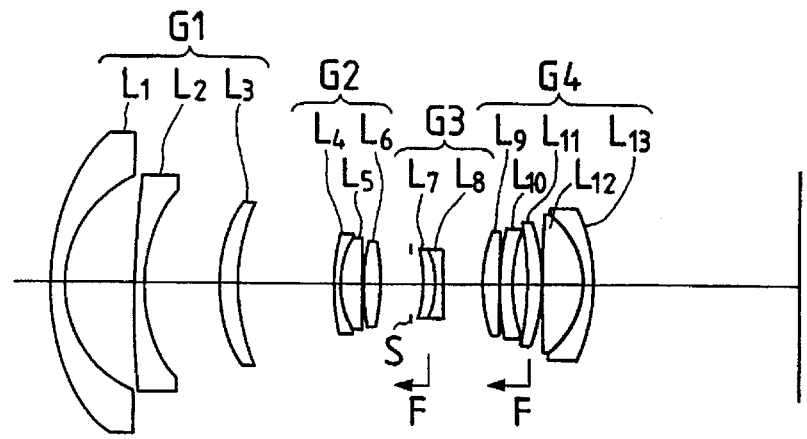
FIG. 8A is a diagram to show the lens structure of a zoom lens in Embodiment 4 according to the present invention.
Figure 8B:
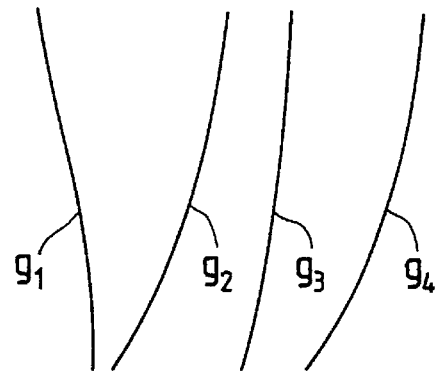
FIG. 8B is a drawing to show movement traces of lens groups in zooming.

Since a zoom lens in Embodiment 4 has the same basic structure as that of the zoom lens in Embodiment 2, as shown in FIG. 8A, the same elements and portions as those in Embodiment 2 are omitted from explanation herein, and only portions different from those in Embodiment 2 will be described in the following.

Figure 8C:
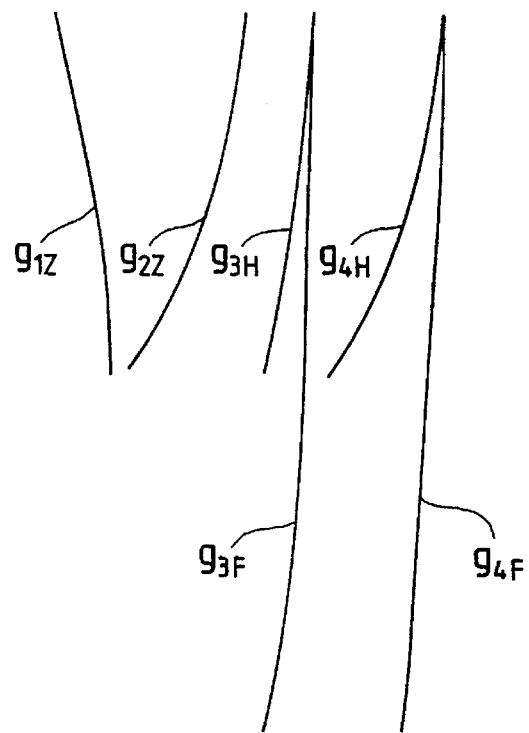
FIG. 8C is a drawing to show shapes of focus cams, zoom cams and compensating zoom cams to define zooming and focusing.

FIG. 8C shows cam shapes actually formed on the rotating barrel in the zoom lens according to the present embodiment. In FIG. 8C, $g_{3F}$ and $g_{4F}$ denote focus cams for the third lens group and for the fourth lens group, respectively, which are the focusing lens groups, and $g_{1Z}$ and $g_{2Z}$ the zoom cams for the first lens group and for the second lens group, respectively.

Further, $g_{3H}$ represents a compensating zoom cam for the third lens group and $g_{4H}$ a compensating zoom cam for the fourth lens group.

In actual zooming, the movement traces $g_3$, $g_4$ of third and fourth lens groups, which are the focusing lens groups, are formed by combinations of the focus cams $g_{3F}$, $g_{4F}$ with the compensating zoom cams $g_{3H}$, $g_{4H}$, respectively.

Also, the movement traces $g_1$, $g_2$ of first and second lens groups taking no part in focusing are formed by the zoom cams $g_{1Z}$, $g_{2Z}$ for the first lens group and for the second lens group as they are.

Table 15 shows numerical values defining the cam traces of the focus cams $g_{1Z}$, $g_{2Z}$ for the first lens group G1 and for the second lens group G2.

TABLE 15

| ANGLE | (1) | (2) | F |
|---|---|---|---|
| .000 | .000 | .000 | 16.400 |
| 1.000 | −.064 | .036 | 16.434 |
| 2.000 | −.152 | .086 | 16.481 |
| 3.000 | −.261 | .148 | 16.540 |
| 4.000 | −.388 | .221 | 16.609 |
| 5.000 | −.531 | .305 | 16.688 |
| 6.000 | −.687 | .399 | 16.777 |
| 7.000 | −.854 | .501 | 16.873 |
| 8.000 | −1.029 | .610 | 16.976 |
| 9.000 | −1.210 | .726 | 17.085 |
| 10.000 | −1.394 | .846 | 17.199 |
| 11.000 | −1.580 | .971 | 17.317 |
| 12.000 | −7.765 | 1.099 | 17.437 |
| 13.000 | −1.947 | 1.228 | 17.559 |
| 14.000 | −2.124 | 1.358 | 17.682 |
| 15.000 | −2.295 | 1.486 | 17.803 |
| 16.000 | −2.458 | 1.612 | 17.922 |
| 17.000 | −2.612 | 1.734 | 18.037 |
| 18.000 | −2.756 | 1.851 | 18.147 |
| 19.000 | −2.892 | 1.964 | 18.254 |
| 20.000 | −3.022 | 2.075 | 18.359 |
| 21.000 | −3.148 | 2.186 | 18.463 |
| 22.000 | −3.272 | 2.298 | 18.569 |
| 23.000 | −3.395 | 2.411 | 18.676 |
| 24.000 | −3.519 | 2.529 | 18.787 |
| 25.000 | −3.645 | 2.652 | 18.903 |
| 26.000 | −3.774 | 2.782 | 19.026 |
| 27.000 | −3.908 | 2.920 | 19.157 |
| 28.000 | −4.046 | 3.069 | 19.297 |
| 29.000 | −4.190 | 3.229 | 19.448 |
| 30.000 | −4.340 | 3.402 | 19.612 |
| 31.000 | −4.494 | 3.590 | 19.790 |
| 32.000 | −4.654 | 3.794 | 19.983 |
| 33.000 | −4.817 | 4.015 | 20.191 |
| 34.000 | −4.982 | 4.250 | 20.414 |
| 35.000 | −5.143 | 4.498 | 20.649 |
| 36.000 | −5.299 | 4.755 | 20.892 |
| 37.000 | −5.447 | 5.019 | 21.143 |
| 38.000 | −5.586 | 5.287 | 21.397 |
| 39.000 | −5.714 | 5.558 | 21.655 |
| 40.000 | −5.831 | 5.829 | 21.913 |
| 41.000 | −5.936 | 6.100 | 22.171 |
| 42.000 | −6.031 | 6.369 | 22.428 |
| 43.000 | −6.115 | 6.637 | 22.684 |
| 44.000 | −6.189 | 6.905 | 22.941 |

TABLE 15-continued

| ANGLE | (1) | (2) | F |
|---|---|---|---|
| 45.000 | −6.255 | 7.178 | 23.202 |
| 46.000 | −6.313 | 7.457 | 23.470 |
| 47.000 | −6.363 | 7.750 | 23.751 |
| 48.000 | −6.406 | 8.062 | 24.052 |
| 49.000 | −6.440 | 8.404 | 24.382 |
| 50.000 | −6.463 | 8.782 | 24.747 |
| 51.000 | −6.471 | 9.202 | 25.155 |
| 52.000 | −6.459 | 9.669 | 25.610 |
| 53.000 | −6.422 | 10.189 | 26.118 |
| 54.000 | −6.353 | 10.763 | 26.682 |
| 55.000 | −6.247 | 11.389 | 27.300 |

In Table 15, the left end column shows rotation angles θ (ANGLE) of the rotating barrel, the second and the third columns movement amounts of the first and second lens groups along the optical axis, and the right end column corresponding focal lengths (F). Since the movement traces $g_1$, $g_2$ of the first lens group and the second lens group taking no part in focusing are coincident with the zoom cams $g_{1Z}$, $g_{2Z}$ for the first and second lens groups, respectively, the movement amounts along the optical axis in Table 15 should be coincident with those along the optical axis in Table 9.

Numerical values defining the cam shapes of the compensating zoom cam $g_{3H}$ for the third lens group and of the compensating zoom cam $g_{4H}$ for the fourth lens group are the same as those in Table 12 in Embodiment 2. In Table 12, the left end column shows rotation angles θ (ANGLE) of the rotating barrel, the second and third columns movement amounts of the third and fourth lens groups, respectively, along the optical axis, and the right end column corresponding focal lengths (F).

In Embodiment 4, in zooming, the movement traces $g_3$, $g_4$ of the third and fourth lens groups, which are the focusing lens groups, are formed by combinations of the focus cams $g_{3F}$, $g_{4F}$ with the compensating zoom cams $g_{3H}$, $g_{4H}$, respectively, and therefore the sums between the axial movement amounts in Table 10 and the corresponding axial movement amounts in Table 12 should correspond to the axial movement amounts in Table 9.

The present embodiment is excellent not only in performance in the entire zooming range in shooting at the infinite focus position, but also in imaging performance with less change in aberration in shooting at the closest focus position.

Although the present embodiment is so arranged that the zoom cams $g_{1Z}$, $g_{2Z}$ for the first and second lens groups taking no part in focusing are not combined with the compensating zoom cams $g_{3H}$, $g_{4H}$ but are coincident with the movement traces $g_1$, $g_2$ of the first and second lens groups, the zoom lens may be arranged such that the zoom cam ($g_{1Z}$ or $g_{2Z}$) for either one of the lens groups is combined with the compensating zoom cam ($g_{3H}$ or $g_{4H}$). In this case, however, the shape of the one zoom cam must be changed such that the combination with the compensating zoom cam can provide the movement trace of the non-focusing lens group in zooming. Table 16 shows numerical values defining the cam trace of the zoom cam $g_{2Z}$ for the second lens group combined with the compensating zoom cam $g_{3H}$ for the third lens group in Embodiment 4. Since the zoom cam $g_{1Z}$ for the first lens group is not combined with the compensating zoom cam, the movement trace thereof is coincident with the movement trace $g_1$ of the first lens group as in Table 15.

TABLE 16

| ANGLE | (1) | (2) | F |
|---|---|---|---|
| .000 | .000 | .000 | 16.400 |
| 1.000 | −.064 | .023 | 16.434 |
| 2.000 | −.152 | .054 | 16.481 |
| 3.000 | −.261 | .093 | 16.540 |
| 4.000 | −.388 | .139 | 16.609 |
| 5.000 | −.531 | .191 | 16.688 |
| 6.000 | −.687 | .248 | 16.777 |
| 7.000 | −.854 | .311 | 16.873 |
| 8.000 | −1.029 | .378 | 16.976 |
| 9.000 | −1.210 | .448 | 17.085 |
| 10.000 | −1.394 | .522 | 17.199 |
| 11.000 | −1.580 | .598 | 17.317 |
| 12.000 | −1.765 | .676 | 17.437 |
| 13.000 | −1.947 | .755 | 17.559 |
| 14.000 | −2.124 | .834 | 17.682 |
| 15.000 | −2.295 | .912 | 17.803 |
| 16.000 | −2.458 | .989 | 17.922 |
| 17.000 | −2.612 | 1.063 | 18.037 |
| 18.000 | −2.756 | 1.134 | 18.147 |
| 19.000 | −2.892 | 1.203 | 18.254 |
| 20.000 | −3.022 | 1.271 | 18.359 |
| 21.000 | −3.148 | 1.338 | 18.463 |
| 22.000 | −3.272 | 1.406 | 18.569 |
| 23.000 | −3.395 | 1.474 | 18.676 |
| 24.000 | −3.519 | 1.546 | 18.787 |
| 25.000 | −3.645 | 1.620 | 18.903 |
| 26.000 | −3.774 | 1.698 | 19.026 |
| 27.000 | −3.908 | 1.782 | 19.157 |
| 28.000 | −4.046 | 1.871 | 19.297 |
| 29.000 | −4.190 | 1.967 | 19.448 |
| 30.000 | −4.340 | 2.071 | 19.612 |
| 31.000 | −4.494 | 2.184 | 19.790 |
| 32.000 | −4.654 | 2.306 | 19.983 |
| 33.000 | −4.817 | 2.438 | 20.191 |
| 34.000 | −4.982 | 2.579 | 20.414 |
| 35.000 | −5.143 | 2.727 | 20.649 |
| 36.000 | −5.299 | 2.881 | 20.892 |
| 37.000 | −5.447 | 3.038 | 21.143 |
| 38.000 | −5.586 | 3.198 | 21.397 |
| 39.000 | −5.714 | 3.360 | 21.655 |
| 40.000 | −5.831 | 3.522 | 21.913 |
| 41.000 | −5.936 | 3.683 | 22.171 |
| 42.000 | −6.031 | 3.844 | 22.428 |
| 43.000 | −6.115 | 4.003 | 22.684 |
| 44.000 | −6.189 | 4.163 | 22.941 |
| 45.000 | −6.255 | 4.325 | 23.202 |
| 46.000 | −6.313 | 4.490 | 23.470 |
| 47.000 | −6.363 | 4.662 | 23.751 |
| 48.000 | −6.406 | 4.846 | 24.052 |
| 49.000 | −6.440 | 5.047 | 24.382 |
| 50.000 | −6.463 | 5.269 | 24.747 |
| 51.000 | −6.471 | 5.518 | 25.155 |
| 52.000 | −6.459 | 5.797 | 25.610 |
| 53.000 | −6.422 | 6.109 | 26.118 |
| 54.000 | −6.353 | 6.458 | 26.682 |
| 55.000 | −6.247 | 6.841 | 27.300 |

As described above, the present invention can provide the inner focus or rear focus zoom lens of so-called floating-type with a plurality of lens groups moving in the lens system, by a simple structure enabling the so-called manual focus.

In more detail, the zoom lens according to the present invention is simple in respect of mechanical design, as described in the embodiments, because only the focus cams are used in focusing. For example, a zoom cam for each non-focusing lens is provided in a cam barrel, a compensating zoom cam for each focusing lens group in a stationary barrel, and focus cams for the focusing lens groups in a plurality of cam barrels newly added. (As described above, the compensating zoom cam and the focus cam for a focusing lens group both may be provided in a newly added cam barrel.)

By the above arrangement, the previously complex focusing method with a plurality of lens groups moving in the zoom lens can be achieved with a simple structure by adding cam barrels for the focusing lens groups to the double structure (of stationary barrel and cam barrel), which is the same structure as that of a conventionally known zoom lens of so-called front-focus-type.

All zoom cams for non-focusing lens groups do not have to be cut in the cam barrels in respect of mechanical design, as described in Embodiment 4, but a part thereof may be formed in the focusing cam barrel if necessary. In this case, however, the shape of the zoom cam must be changed, as described in Embodiment 4, such that the combination with the compensating zoom cam for the focusing lens group corresponding to the focusing cam barrel can provide a movement trace of the non-focusing lens group in zooming.

Further, in case that there is a focusing lens group fixed with respect to the image plane in zooming, the cam shapes of the focus cam and compensating zoom cam for the focusing lens group should be symmetric with each other with respect to the rotational direction of rotating barrel in the zooming range. In this case, however, the focusing lens group is fixed in respect of optical design, but is a combination of movable elements in respect of mechanical design. Therefore, the focusing lens group should be optically advantageously constructed more positively as a moving group rather than as a fixed focusing lens group with respect to the image plane in zooming.

Also, in case that there is a lens group fixed with respect to the image plane in zooming and taking no part in focusing, the holding barrel holding the fixed lens group should be directly connected to the fixed barrel.

What is claimed is:

1. A zoom lens system with both zooming and focusing functions, having a plurality of lens groups including at least two focusing lens groups which move by different amounts in zooming or in focusing:

wherein when a predetermined movement trace for zooming is expressed with a variable of rotation angle of a rotating barrel for defining a displacement amount of a lens group along an optical axis, a movement trace of a first focusing lens group is formed by a combination of a first focus cam with a first compensating zoom cam, a movement trace of an n-th focusing lens group is formed by a combination of an n-th focus cam with an n-th compensating zoom cam, and a movement trace of each movable non-focusing lens group taking no part in focusing is formed by a combination of one of said first to n-th compensating zoom cams with a zoom cam for said non-focusing lens group.

2. A zoom lens system according to claim 1, wherein, in focusing, the focusing lens groups move on the focus cams therefor by a same rotation angle to achieve focusing.

3. A zoom lens system according to claim 1, having at least one focusing lens group stationary in zooming.

4. A zoom lens system according to claim 1, and which has a non-focusing lens group that is stationary in zooming and taking no part in focusing, and that has a movement trace formed by a corresponding zoom cam without being combined with any compensating zoom cam.

5. A zoom lens system with both zooming and focusing functions, having a plurality of lens groups including at least two focusing lens groups which move by different amounts in zooming or in focusing:

wherein when a predetermined movement trace for zooming is expressed with a variable of rotation angle of a rotating barrel for defining a displacement amount of a lens group along an optical axis, a movement trace of a first focusing lens group is formed by a combination of a first focus cam with a first compensating zoom cam, a movement trace of a second focusing lens group is formed by a combination of a second focus cam with a second compensating zoom cam, and a movement trace of each movable non-focusing lens group taking no part in focusing is formed by a combination of one of said first and second compensating zoom cams with a zoom cam for said non-focusing lens group.

6. A zoom lens system according to claim 5, wherein the movement trace of each movable non-focusing lens group is formed by a combination of the first compensating zoom cam with the zoom cam for said non-focusing lens group.

7. A zoom lens system according to claim 5, wherein the movement trace of each movable non-focusing lens group is formed by a combination of the second compensating zoom cam with the zoom cam for said non-focusing lens group.

8. A zoom lens system according to claim 5, wherein a movement trace of at least one movable non-focusing lens group is formed by a combination of the first compensating zoom cam with a zoom cam for said one non-focusing lens group, and wherein a movement trace of another movable non-focusing lens group is formed by a combination of the second compensating zoom cam with a zoom cam for said another non-focusing lens group.

9. A zoom lens system according to claim 5, having two movable non-focusing lens groups.

10. A zoom lens system according to claim 5, wherein, in focusing, the focusing lens groups move on the focus cams therefor by a same rotation angle to achieve focusing.

11. A zoom lens system according to claim 5, and which has a first positive lens group, a second negative lens group, a third positive lens group, and a fourth positive lens group arranged in the named order from the object side.

12. A zoom lens system according to claim 11, wherein the focusing lens groups comprise said second lens group and said third lens group.

13. A zoom lens system according to claim 5, and which has a first negative lens group, a second positive lens group, a third negative lens group, and a fourth positive lens group arranged in the named order from an object side.

14. A zoom lens system according to claim 13, wherein the focusing lens groups comprise said third lens group and said fourth lens group.

15. A zoom lens system with both zooming and focusing functions, having a plurality of lens groups including at least two focusing lens groups which move by different amounts in zooming or in focusing:

wherein when a predetermined movement trace for zooming is expressed with a variable of rotation angle of a rotating barrel for defining a displacement amount of a lens group along an optical axis, a movement trace of a first focusing lens group is formed by a combination of a first focus cam with a first compensating zoom cam, a movement trace of an n-th focusing lens group is formed by a combination of an n-th focus cam with an n-th compensating zoom cam, and a movement trace of at least one movable non-focusing lens group taking no part in focusing is determined only by a zoom cam for said non-focusing lens group without being combined with any of said first to n-th compensating zoom cams.

16. A zoom lens system according to claim 15, wherein, in focusing, the focusing lens groups move on the focus cams therefor by a same rotation angle to achieve focusing.

17. A zoom lens system according to claim 16, and which has a non-focusing lens group that is stationary in zooming and taking no part in focusing, and that has a movement trace formed by a corresponding zoom cam without being combined with any compensating zoom cam.

18. A zoom lens system with both zooming and focusing functions, having a plurality of lens groups including at least two focusing lens groups which move by different amounts in zooming or in focusing:

wherein when a predetermined movement trace for zooming is expressed with a variable of rotation angle of a rotating barrel for defining a displacement amount of a lens group along an optical axis, a movement trace of a first focusing lens group is formed by a combination of a first focus cam with a first compensating zoom cam, a movement trace of a second focusing lens group is formed by a combination of a second focus cam with a second compensating zoom cam, and a movement trace of at least one movable non-focusing lens group taking no part in focusing is determined only by a zoom cam for said non-focusing lens group without being combined with said first compensating zoom cam or with said second compensating zoom cam.

19. A zoom lens system according to claim 18, wherein the movement trace of each movable non-focusing lens group is determined only by the zoom cam therefor without being combined with said first compensating zoom cam or with said second compensating zoom cam.

20. A zoom lens system according to claim 18, having two movable non-focusing lens groups.

21. A zoom lens system according to claim 18, wherein, in focusing, the focusing lens groups move on the respective focus cams therefor by a same rotation angle to achieve focusing.

22. A zoom lens system according to claim 18, and which has a first positive lens group, a second negative lens group, a third positive lens group, and a fourth positive lens group arranged in the named order from an object side.

23. A zoom lens system according to claim 22, wherein the focusing lens groups comprise said second lens group and said third lens group.

24. A zoom lens system according to claim 18, and which has a first negative lens group, a second positive lens group, a third negative lens group, and a fourth positive lens group arranged in the named order from an object side.

25. A zoom lens system according to claim 24, wherein the focusing lens groups comprise said third lens group and said fourth lens group.

* * * * *